United States Patent
Byon et al.

(10) Patent No.: US 11,412,143 B2
(45) Date of Patent: Aug. 9, 2022

(54) ELECTRONIC DEVICE AND METHOD FOR CONTROLLING CAMERA MOTION

(71) Applicant: Samsung Electronics Co., Ltd., Gyeonggi-do (KR)

(72) Inventors: Kwangseok Byon, Gyeonggi-do (KR); Dongsung Hur, Gyeonggi-do (KR); Youngjae Hwang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/106,278

(22) Filed: Nov. 30, 2020

(65) Prior Publication Data

US 2021/0176399 A1 Jun. 10, 2021

(30) Foreign Application Priority Data

Dec. 6, 2019 (KR) .................. 10-2019-0161241

(51) Int. Cl.
*H04N 5/232* (2006.01)
*H04N 5/225* (2006.01)
*G03B 5/02* (2021.01)
*G03B 13/32* (2021.01)

(52) U.S. Cl.
CPC ..... *H04N 5/23287* (2013.01); *H04N 5/23258* (2013.01); *H04N 5/2252* (2013.01)

(58) Field of Classification Search
CPC ........... H04N 5/23287; H04N 5/23258; H04N 5/2252; H04N 5/2257; H04N 5/23299; H04N 5/2253; H04N 5/2254; G03B 5/02; G03B 13/32; G03B 2205/0007
See application file for complete search history.

(56) References Cited

U.S. PATENT DOCUMENTS

| | | | |
|---|---|---|---|
| 9,215,373 B2 | 12/2015 | Lee | |
| 11,039,071 B2 | 6/2021 | Min | |
| 2004/0085464 A1 | 5/2004 | Higurashi et al. | |
| 2016/0057351 A1* | 2/2016 | Noguchi | H04N 5/23287 348/208.4 |

(Continued)

FOREIGN PATENT DOCUMENTS

| | | | |
|---|---|---|---|
| JP | 2004-144824 A | 5/2004 | |
| JP | 2006-154345 A | 6/2006 | |

(Continued)

OTHER PUBLICATIONS

International Search Report dated Feb. 26, 2021.

*Primary Examiner* — Christopher K Peterson
(74) *Attorney, Agent, or Firm* — Cha & Reiter, LLC

(57) ABSTRACT

In embodiments, an electronic device may include a processor and a camera module functionally connected to the processor. The camera module may include a lens assembly including at least one lens, and an image sensor for processing light acquired through the lens assembly. The processor may be configured to identify position information of the lens assembly, to move the camera module within a first range to correct a shake in an image acquired through the image sensor when the position information of the lens assembly corresponds to a first position, and to move the camera module within a second range to correct the shake in the image acquired through the image sensor when the position information of the lens assembly corresponds to a second position.

19 Claims, 24 Drawing Sheets

(56) References Cited

U.S. PATENT DOCUMENTS

| | | |
|---|---|---|
| 2017/0302854 A1 | 10/2017 | Noguchi |
| 2017/0353635 A1* | 12/2017 | Shin ...................... H04N 7/183 |
| 2018/0188474 A1 | 7/2018 | Enta |
| 2018/0284569 A1 | 10/2018 | Minamisawa et al. |

FOREIGN PATENT DOCUMENTS

| | | |
|---|---|---|
| JP | 2007-248672 A | 9/2007 |
| JP | 2016-080918 A | 5/2016 |
| KR | 10-2018-0135269 A | 12/2018 |

* cited by examiner

ELECTRONIC DEVICE AND METHOD FOR CONTROLLING CAMERA MOTION

CROSS-REFERENCE TO RELATED APPLICATION(S)

This application is based on and claims priority under 35 U.S.C. 119 to Korean Patent Application No. 10-2019-0161241, filed on Dec. 6, 2019, in the Korean Intellectual Property Office, the disclosures of which are herein incorporated by reference in their entireties.

BACKGROUND

Field

The disclosure relates to an electronic device and method for controlling a camera motion.

Description of Related Art

There are a variety of electronic devices, including a smart phone, a tablet personal computer (PC), a portable multimedia player (PMP), a personal digital assistant (PDA), a laptop PC, and a wearable device such as a wrist watch or a head-mounted display (HMD), that may have a camera equipped capture an image.

In order to obtain a clear image, the camera of the electronic device needs to perform stabilizing and focus on the image.

The above information is presented as background information only to assist with an understanding of the disclosure. No determination has been made, and no assertion is made, as to whether any of the above might be applicable as prior art with regards to the disclosure.

SUMMARY

According to certain embodiments, an electronic device comprises: a processor; and a camera module functionally connected to the processor, wherein the camera module includes: a lens assembly including at least one lens; and an image sensor for processing light acquired through the lens assembly, and wherein the processor is configured to: determine position information of the lens assembly, move the camera module within a first range to correct for shaking in an image acquired through the image sensor when the position information of the lens assembly corresponds to a first position, and move the camera module within a second range to correct for shaking in the image when the position information of the lens assembly corresponds to a second position.

According to certain embodiments, the camera module further includes a focus control module configured to determine the position information of the lens assembly.

According to certain embodiments, the position information of the lens assembly is determined based on at least one of a focal length calculated to focus on a targeted object, a focus position, or a physical position of the lens assembly.

According to certain embodiments, the electronic device further comprises: a gyro sensor or an acceleration sensor disposed inside or outside the camera module, wherein the processor is configured to move the camera module within the first range or the second range when a movement of the electronic device is detected through the gyro sensor or the acceleration sensor.

According to certain embodiments, the electronic device further comprises: a housing, wherein the camera module is disposed in the housing; an image stabilizer actuator configured to move the camera module, wherein the image stabilizer is disposed in the housing; and a rotation guide combined with the housing and providing a guide for a rotation angle of the camera module.

According to certain embodiments, the electronic device further comprises at least one camera module stopper configured to restrict motion of the camera module.

According to certain embodiments, the processor is further configured to move the camera module within a third range to correct for shaking in the image when the position information of the lens assembly corresponds to a third position.

According to certain embodiments, the processor is further configured to move the camera module within the first range when the position information of the lens assembly corresponds to an infinite focus position.

According to certain embodiments, the processor is further configured to move the camera module within the second range when the position information of the lens assembly corresponds to a middle focus position.

According to certain embodiments, the processor is further configured to move the camera module within the third range when the position information of the lens assembly corresponds to a macro focus position.

According to certain embodiments, an electronic device comprises: a camera; at least one memory; and a processor functionally connected to the camera and the at least one memory, wherein the camera includes: a camera module comprising an image sensor and a lens assembly, wherein the image sensor is configured to capture an image, and wherein the lens assembly is configured to move, and wherein movement by the lens assembly causes a focusing operation of the image; and an image stabilizer actuator for moving the lens assembly, and wherein the processor is configured to: activate the camera, move a position of the lens assembly in the focus operation, determine a movement angle range of the camera module corresponding to the moved position of the lens assembly, and move the camera module within the determined movement angle range.

According to certain embodiments, an electronic device further comprises a gyro sensor or an acceleration sensor disposed inside or outside the camera, wherein the processor is configured to move the camera module within the determined movement angle range when a movement of the electronic device is detected through the gyro sensor or the acceleration sensor.

According to certain embodiments, the electronic device further comprises a housing, wherein the camera module and the image stabilizer actuator are disposed in the housing; and a rotation guide receiving the housing and providing a guide for a rotation angle of the camera module.

According to certain embodiments, the electronic device further comprises at least one camera module stopper capable of restricting a motion of the camera module.

According to certain embodiments, the processor is further configured to: identify the moved position of the lens assembly, move the camera module within a first movement angle range when the moved position is a first position, move the camera module within a second movement angle range when the moved position is a second position, and move the camera module within a third movement angle range when the moved position is a third position.

According to certain embodiments, the electronic device further comprises the processor is further configured to move the camera module within the first movement angle range when the moved position of the lens assembly corresponds to an infinite focus position.

According to certain embodiments, the electronic device further comprises the processor is further configured to move the camera module within the second movement angle range when the moved position of the lens assembly corresponds to a middle focus position.

According to certain embodiments, the electronic device further comprises the processor is further configured to move the camera module within the third movement angle range when the moved position of the lens assembly corresponds to a macro focus position.

According to certain embodiments, the electronic device further comprises the camera module further includes a focus control module configured to determine the moved position of the lens assembly.

According to certain embodiments, a control method of an electronic device, comprises: identifying position information of a lens assembly included in a camera module functionally connected to the electronic device; determining a movement range of the camera module as a first range when the position information of the lens assembly corresponds to a first position; determining the movement range of the camera module as a second range when the position information of the lens assembly corresponds to a second position; and controlling a motion of the camera module, based on the first range or the second range.

BRIEF DESCRIPTION OF THE DRAWINGS

The above and other aspects, features and advantages of certain embodiments of the disclosure will be more apparent from the following detailed description, taken in conjunction with the accompanying drawings.

DETAILED DESCRIPTION

To stabilize an image, a camera can either use an optical image stabilizer (OIS) based on a lens shift type stabilization or a camera tilting type stabilization.

The lens shift type stabilization uses a technique to move a lens to compensate for the shake of an optical module. For example, the lens may perform a linear motion on a plane parallel with an imaging surface of an image sensor.

The camera tilting type stabilization uses a technique to correct an image by moving a camera lens and an image sensor together. For example, the camera tilting type stabilization matches an optical axis to a virtual axis connecting a targeted object and the center of the camera module. That is, as the optical axis is tilted to compensate for the shake, the virtual axis and the optical axis always coincide with each other, and the image sensor captures an image without blurring. However, when the camera tilting type stabilization is used for a camera included in a size-reduced electronic device, such as a smartphone, there may be difficulties due to the small amount of space for the camera motion.

Certain embodiments of the disclosure provide an electronic device and method for controlling a motion of a camera that uses a camera tilting type stabilization. In addition, certain embodiments of the disclosure provide an electronic device and method for controlling a motion of a camera at various angles in a limited space to compensate for shake.

Hereinafter, certain embodiments of the disclosure will be described in detail with reference to the accompanying drawings.

Figure 1:
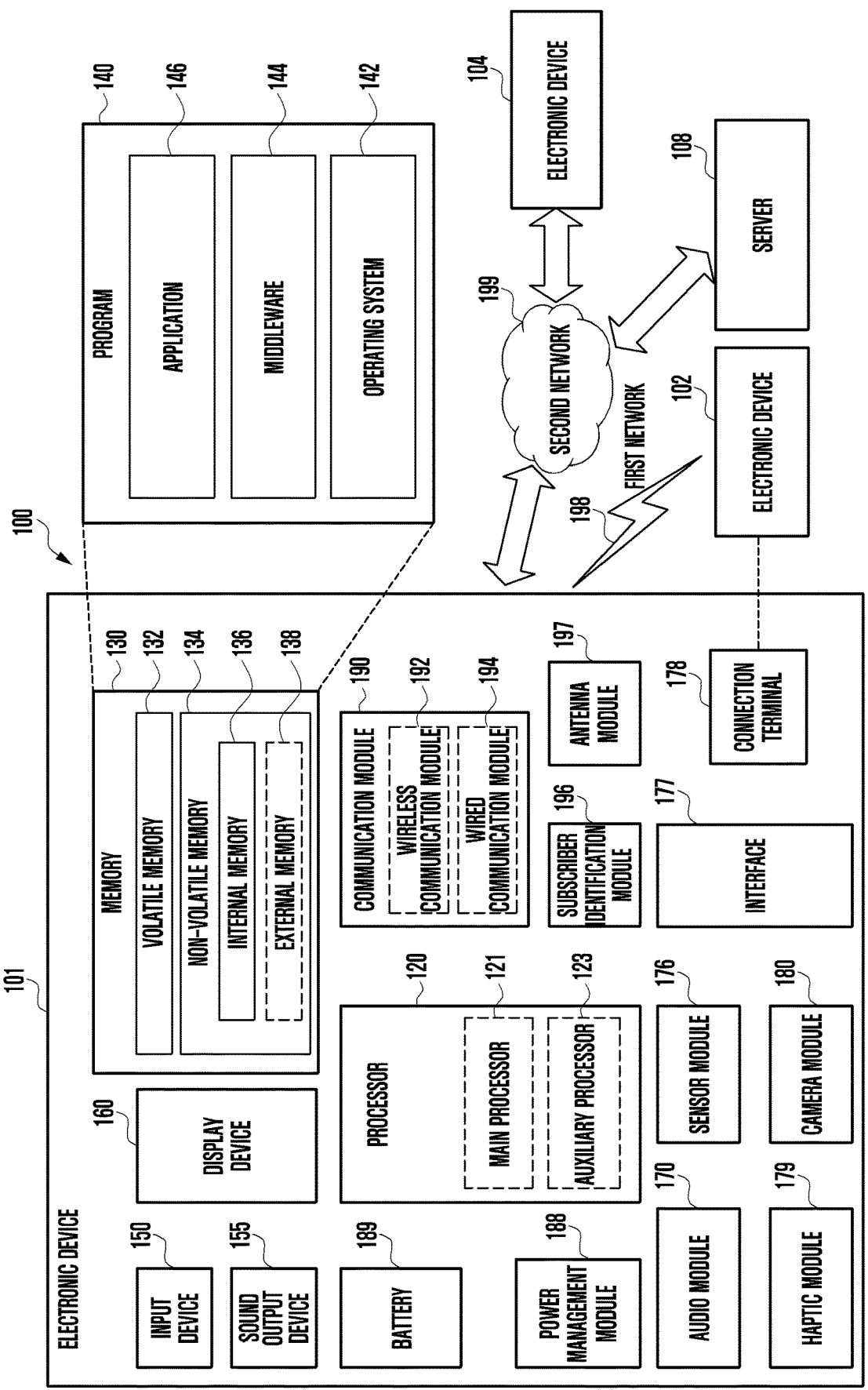
FIG. 1 is a block diagram illustrating an electronic device in a network environment according to an embodiment of the disclosure.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121. The term "processor" shall be understood to refer to the singular context as well as the plural context.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera 180 may capture a still image or moving images. According to an embodiment, the camera 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturers server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

As noted above, to capture a stabilizes image, the camera module 180 can either use an optical image stabilizer (OIS) based on a lens shift type stabilization or a camera tilting type stabilization.

In the case of camera tilting type stabilization, the camera module 180 may have a very small amount of space.

Figure 2:
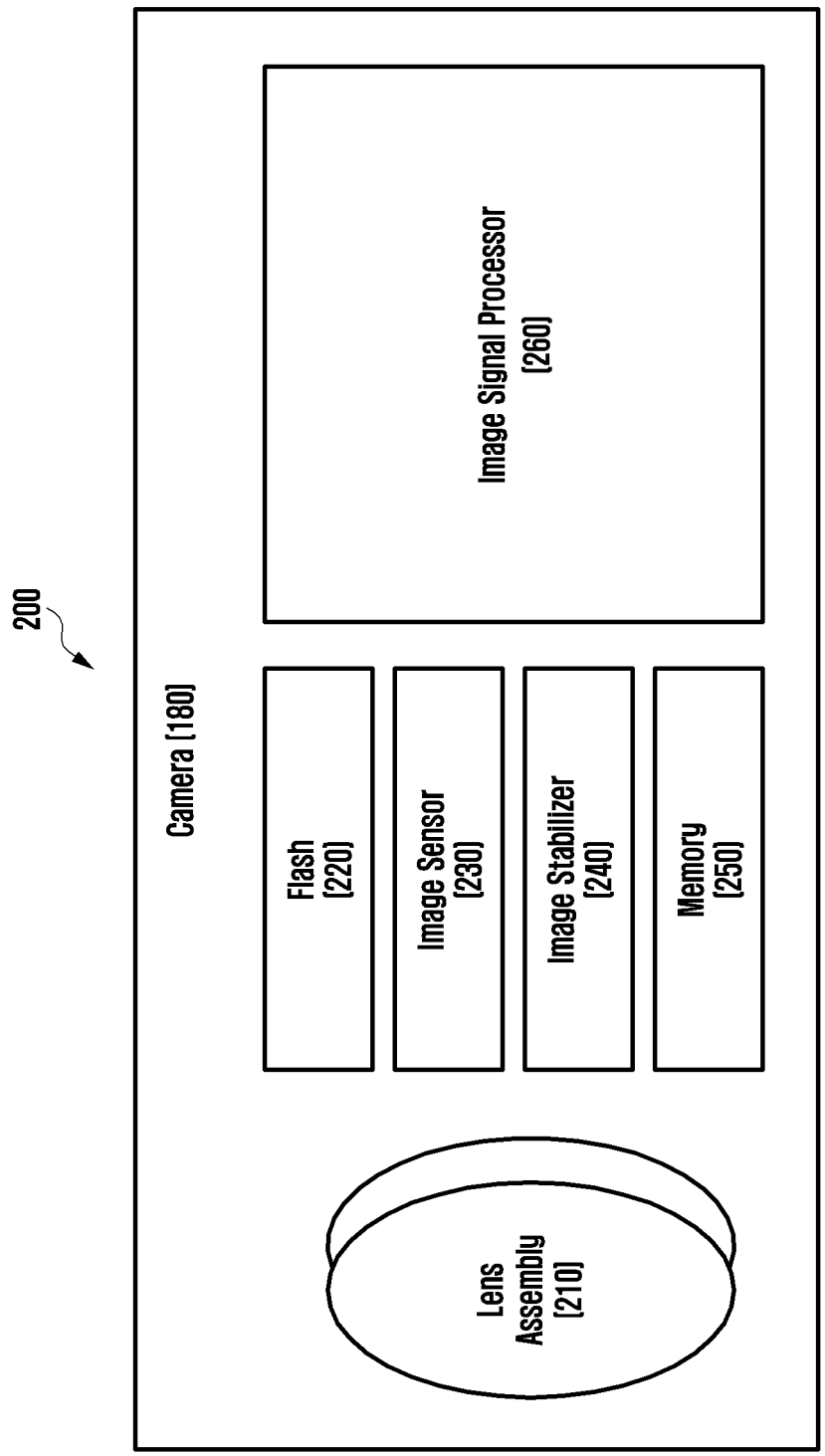
FIG. 2 is a block diagram illustrating a camera according to certain embodiments.

FIG. 2 is a block diagram 200 illustrating a camera module 180 according to certain embodiments. The camera module 180 can include a lens assembly 210 and an image sensor 230. To correct shake in an image acquired through the image sensor 230, a processor 120 in the electronic device 101 can identify the position of the lens assembly, and move the camera module 180 within a first range or a second range based on the position information.

Referring to FIG. 2, the camera 180 may include a lens assembly 210, a flash 220, an image sensor 230, an image stabilizer 240, a memory 250 (e.g., a buffer memory), and/or an image signal processor 260. The lens assembly 210 may collect light reflected from an object which is a target to be image-captured. The lens assembly 210 may include one or more lenses. According to an embodiment, the camera 180 may include a plurality of the lens assemblies 210. The camera 180 may be, for example, a dual camera, a 360-degree camera, or a spherical camera. The plurality of lens assemblies 210 may have the same lens attributes (e.g., a view angle, a focal length, an auto focus, an f-number, and/or an optical zoom), or at least one lens assembly may have one or more lens attributes different from those of the other lens assemblies. The lens assembly 210 may include, for example, a wide-angle lens or a telephoto lens.

The flash 220 may emit light to enhance light reflected from the object. The flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may convert light, collected from the object through the lens assembly 210, into an electrical signal and thereby acquire an image corresponding to the object. According to an embodiment, the image sensor 230 may include one image sensor selected from image sensors having different attributes, such as an RGB sensor, a black-and-white (BW) sensor, an IR sensor, or a UV sensor, a plurality of image sensors having the same attributes, or a plurality of image sensors having different attributes. The image sensor 230 may be implemented as, for example, a charged coupled device (CCD) sensor or a complementary metal oxide semiconductor (CMOS) sensor.

The image stabilizer 240 may move the image sensor 230 or at least one lens included in the lens assembly 210 in a particular direction or control the operating characteristics of the sensor 230 (e.g., adjust a read-out timing) in response to the motion of the camera 180 or the electronic device 101. This may at least partially compensate for image blurring caused by such motion. According to an embodiment, the image stabilizer 240 may detect the motion of the camera 180 or the electronic device 101 by using a gyro sensor (not shown) or an acceleration sensor (not shown) disposed inside or outside the camera 180. The memory 250 may store, at least temporarily, at least a part of an image acquired through the image sensor 230 for a subsequent image processing task. For example, if image acquisition is delayed due to shutter lag, or if multiple images are quickly acquired, the acquired original image (e.g., a Bayer-patterned image or a high-resolution image) may be stored in the memory 250, and a corresponding copy image (e.g., a low-resolution image) may be previewed through the display device 160. When a specified condition is satisfied (e.g., when a predetermined user input or system command is received), at least a part of the original image may be acquired and processed. According to an embodiment, the memory 250 may be configured as at least a part of the memory 130 or as a separate memory that is operated independently from the memory 130.

The image signal processor 260 may perform image processing on an image acquired through the image sensor 230 or an image stored in the memory 250. The image processing may include, for example, depth map generation, three-dimensional (3D) modeling, panorama generation, feature point extraction, image synthesizing, and/or image compensation (e.g., noise reduction, resolution adjustment, brightness adjustment, blurring, sharpening, or softening). Additionally or alternatively, the image signal processor 260 may perform control (e.g., exposure time control or read-out timing control) for at least one component (e.g., the image sensor 230) included in the camera 180. An image processed by the image signal processor 260 may be stored again in the memory 250 for further processing or delivered to an external component (e.g., the memory 130, the display device 160, the electronic device 102, the electronic device 104, or the server 108) outside the camera 180. According to an embodiment, the image signal processor 260 may be configured as at least a part of the processor 120 or as a separate processor that is operated independently from the processor 120. In the latter case, an image processed by the image signal processor 260 may be displayed through the display device 160 as it is or after being further processed by the processor 120.

According to an embodiment, the electronic device 101 may include a plurality of cameras 180 having different attributes (e.g., different view angles) or functions. In this case, the plurality of cameras 180 may include, for example, at least one of a wide-angle camera, a telephoto camera, or an IR camera (such as a time-of-flight camera or a structured light camera). For example, a plurality of camera modules including lenses having different view angles may be configured, and the electronic device may control a change in the view angle in response to a user's selection. According to an embodiment, at least one of the plurality of cameras 180 may be a front camera, and at least one of the other cameras 180 may be a rear camera.

Figure 3:
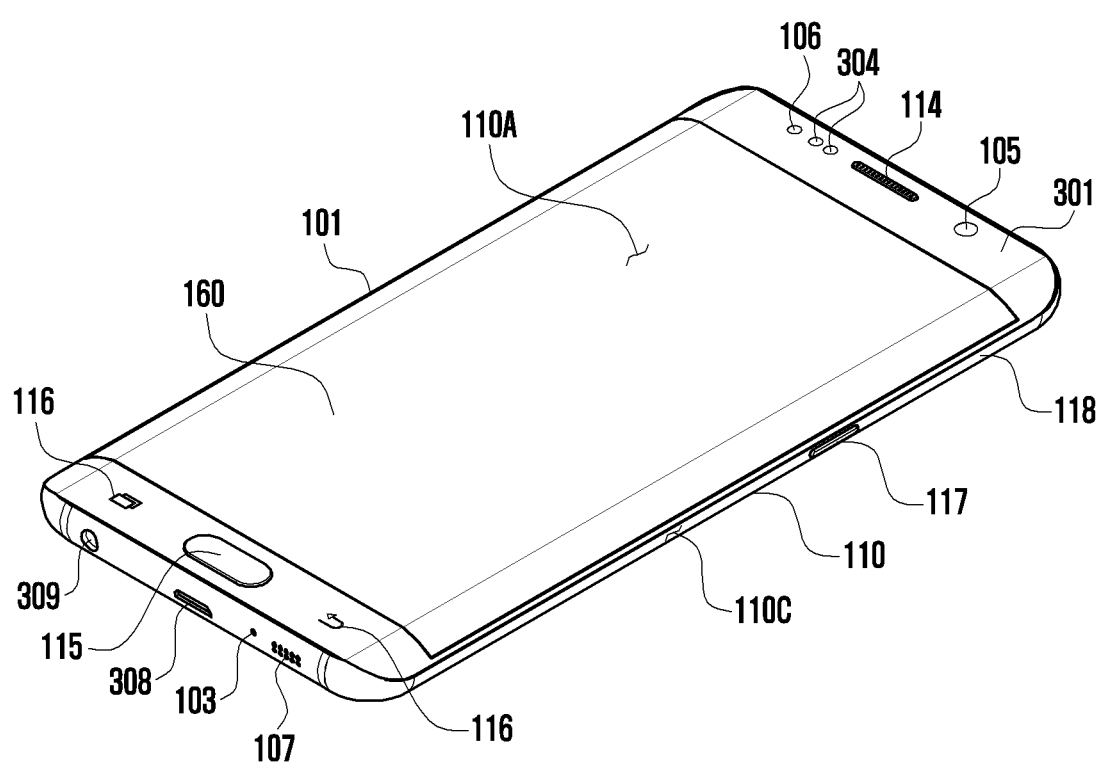
FIG. 3 is a perspective view illustrating a front surface of an electronic device according to an embodiment of the disclosure.
Figure 4:
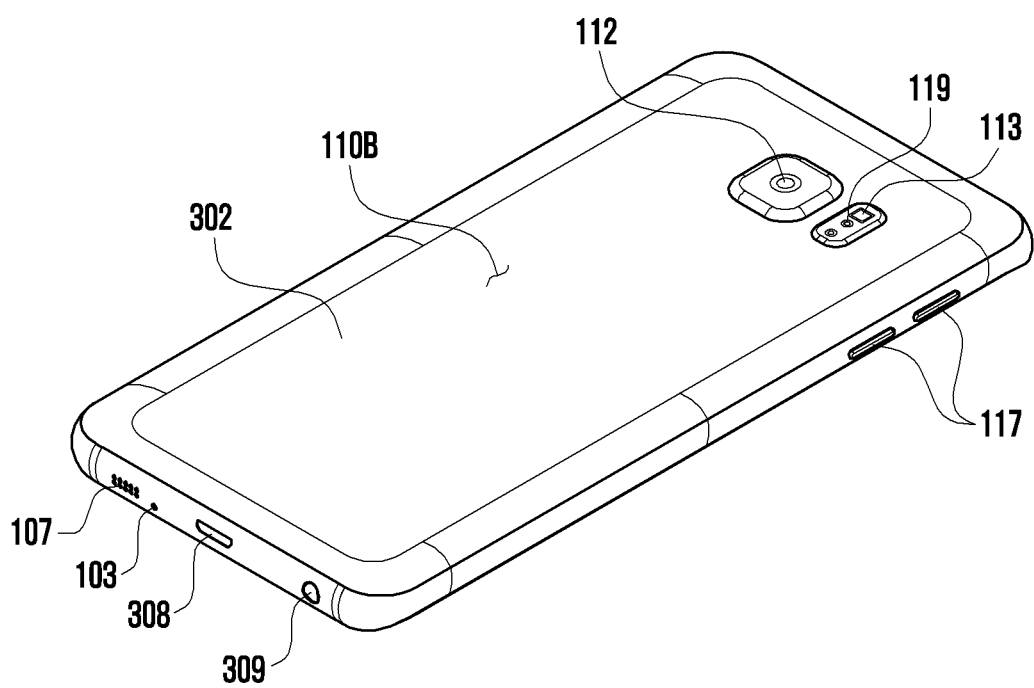
FIG. 4 is a perspective view illustrating a rear surface of the electronic device shown in FIG. 3.

FIG. 3 is a perspective view illustrating a front surface of an electronic device 101 according to an embodiment of the disclosure. FIG. 4 is a perspective view illustrating a rear surface of the electronic device 101 shown in FIG. 3.

Referring to FIGS. 3 and 4, the electronic device 101 according to an embodiment may include a housing 110 having a first surface (or front surface) 110A, a second surface (or rear surface) 110b, and a lateral surface 110C enclosing a space between the first surface 110A and the second surface 110b. In another embodiment (not shown), the housing may refer to a structure forming some of the first surface 110A, the second surface 110b, and the lateral surface 110C. According to an embodiment, the first surface 110A may be formed at least in part by a substantially transparent front plate 301 (e.g., a polymer plate or a glass plate including various coating layers). The second surface 110b may be formed by a substantially opaque rear plate 302. The rear plate 302 may be formed by, for example, coated or colored glass, ceramic, polymer, metal (e.g., aluminum, stainless steel (STS), or magnesium), or a combination of at least two of the above materials. The lateral surface 110C may be coupled to the front plate 301 and the rear plate 302 and be formed by a lateral bezel structure (or "lateral member") 118 having a metal and/or a polymer. In some embodiments, the rear plate 302 and the lateral bezel structure 118 may be integrally formed and have the same material (e.g., a metal material such as aluminum).

According to an embodiment, the electronic device 101 may include at least one of a display device 160, audio modules 103, 107, and 114, sensor modules 304, and 119, cameras 105 and 112 (e.g., the camera 180 in FIGS. 1 and 2), key input device 115, 116, and 117, an indicator 106, and connector ports 308 and 309. In some embodiments, the electronic device 101 may omit at least one (e.g., the key input device 115, 116, or 217 or the indicator 106) of the above components, or may further include other components.

The display device 160 may be exposed through a portion of the front plate 301. For example, the display device 160 may be disposed adjacent to or combined with a touch sensing circuit, a pressure sensor capable of measuring the intensity (or pressure) of a touch, and/or a digitizer capable of detecting a magnetic field type stylus pen.

The audio modules 103, 107, and 114 may include a microphone hole 103 and speaker holes 107 and 114. The microphone hole 103 may contain therein a microphone for obtaining an external sound and, in some embodiments, contain a plurality of microphones to detect a direction of a sound. The speaker holes 107 and 114 may include an external speaker hole 107 and a call receiver hole 114. In some embodiments, the speaker holes 107 and 114 and the microphone hole 103 may be implemented as one hole, or a speaker (e.g., a piezo speaker) may be included without the speaker holes 107 and 114.

The sensor modules 304 and 119 may generate an electrical signal or data value corresponding to an internal operating state or external environmental state of the electronic device 101. The sensor modules 304 and 119 may include, for example, a first sensor module 304 (e.g., a proximity sensor) and/or a second sensor module (not shown) (e.g., a fingerprint sensor), disposed near the first surface 110A of the housing 110, and/or a third sensor module 119 (e.g., a heart rate monitor (HRM) sensor) disposed near the second surface 110b of the housing 110. The fingerprint sensor may be disposed near the second surface 110B as well as the first surface 110A (e.g., a home key button 115) of the housing 110. The electronic device 101 may further include any other sensor module (not shown) such as a gesture sensor, a gyro sensor, an air pressure sensor, a magnetic sensor, an acceleration sensor, a grip sensor, a color sensor, an IR sensor, a biometric sensor, a temperature sensor, a humidity sensor, and/or an illumination sensor 304.

The cameras 105 and 112 may include a first camera device 105 (e.g., the camera 180 in FIGS. 1 and 2) disposed near the first surface 110A, and a second camera device 112 (e.g., the camera 180 in FIGS. 1 and 2) disposed near the second surface 110B. Each camera 105 or 112 may include a plurality of lenses (e.g., the lens assembly 210 in FIG. 2), a flash 113 (e.g., the flash 220 in FIG. 2), an image sensor (e.g., the image sensor 230 in FIG. 2), and/or an image signal processor (e.g., the image signal processor 260 in FIG. 2). The flash 213 may include, for example, a light emitting diode or a xenon lamp. In some embodiments, the lenses (e.g., wide angle and telephoto lenses) and the image sensor may be disposed in the electronic device 101. As can be seen, the cameras occupy small areas.

The key input devices 115, 116, and 117 may include a home key button 115 disposed on the first surface 110A of the housing 110, a touch pad 116 disposed near the home key button 115, and/or a side key button 117 disposed on the lateral surface 110C of the housing 110. In another embodiment, the electronic device 101 may not include some or all of the aforementioned key input devices 115, 116, and 117, and the key input device(s) that is/are not included may be implemented in any other form such as a soft key on the display device 160.

The indicator 106 may be disposed on the first surface 110A of the housing 110. The indicator 106 may include a light emitting diode (LED), and may provide, for example, state information of the electronic device 101 in an optical form.

The connector ports 308 and 309 may include a first connector port 308 that may receive a connector (e.g., a USB connector) for transmitting and receiving power and/or data to and from an external electronic device, and/or a second connector port 309 (e.g., earphone jack) that may receive a connector for transmitting and receiving audio signals to and from an external electronic device.

Figure 5:
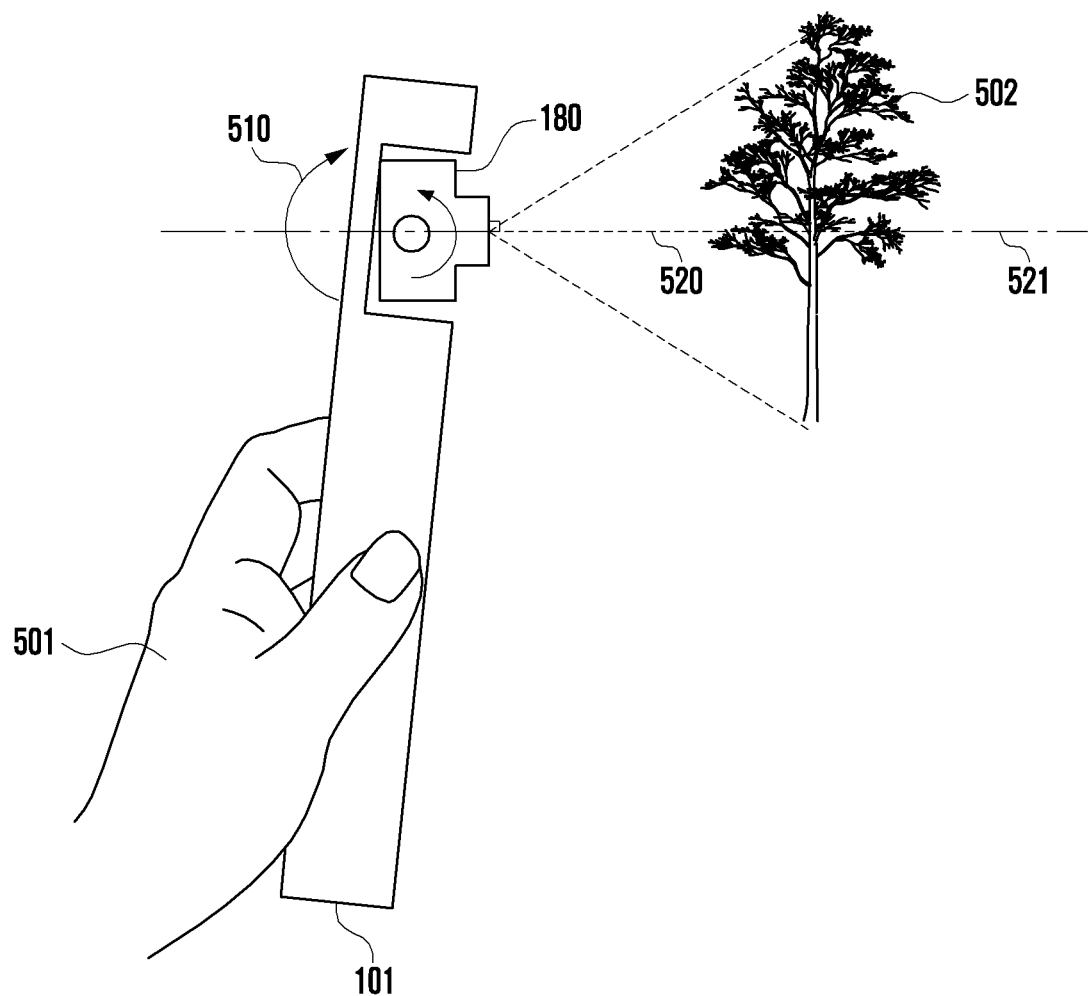
FIG. 5 is a diagram illustrating an operation of a camera including an optical image stabilizer of a camera tilting type according to certain embodiments of the disclosure.

FIG. 5 is a diagram illustrating an operation of a camera 180 including camera tilting according to certain embodiments of the disclosure. The electronic device 101 may include the camera 180. When the user's hand 501 causes the electronic device 101 to shake (arrow 510), the camera 180 tilts, rotates, and moves within the electronic device, in directions opposite to the shaking. As a result, although the electronic device 101 moves relative to a virtual axis 520, the camera 180 maintains a position where an optical axis 521, the center of the camera 180 to the object 502, coincides with the virtual axis 520.

Figure 6:
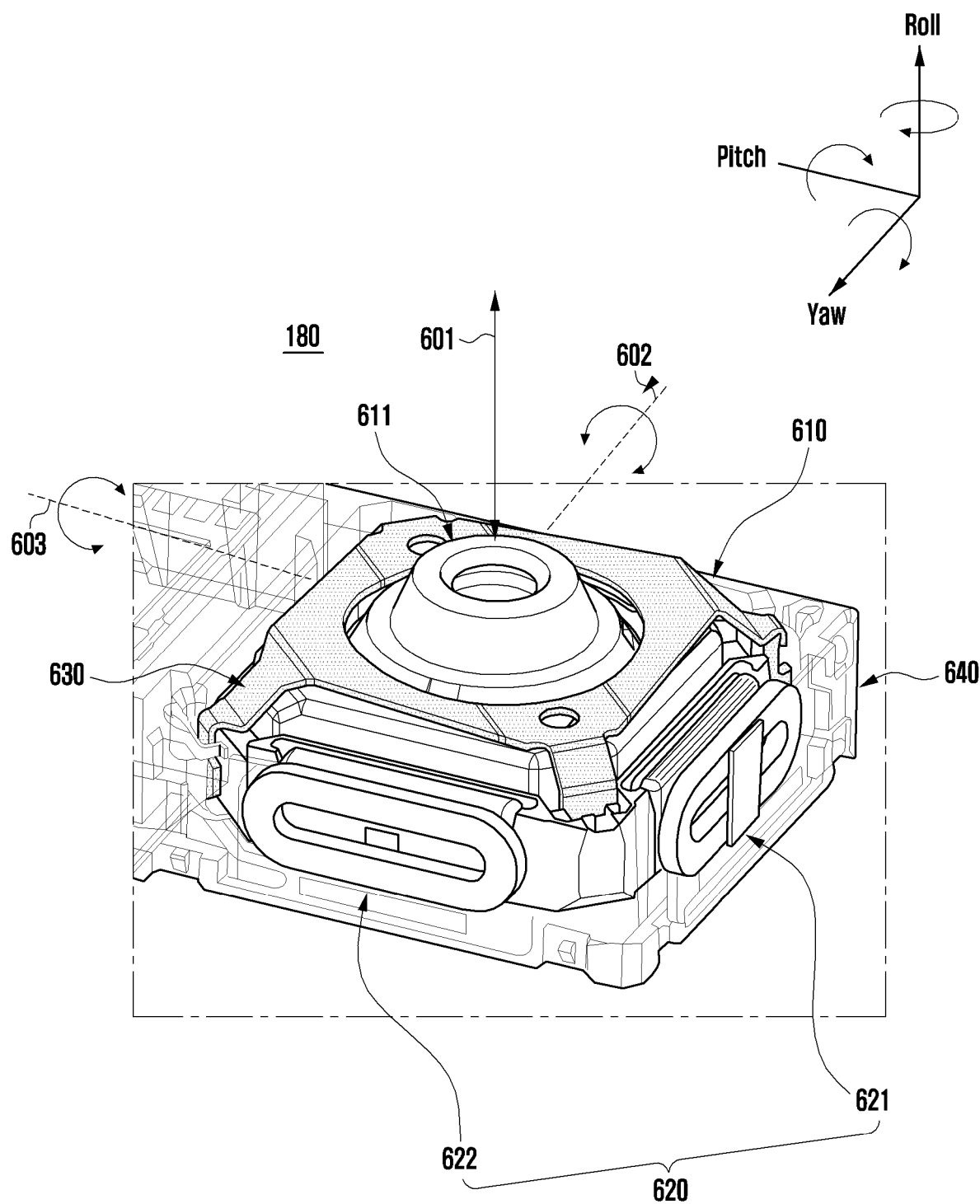
FIG. 6 is a perspective view transparently in part illustrating a camera included in an electronic device according to certain embodiments of the disclosure.
Figure 7:
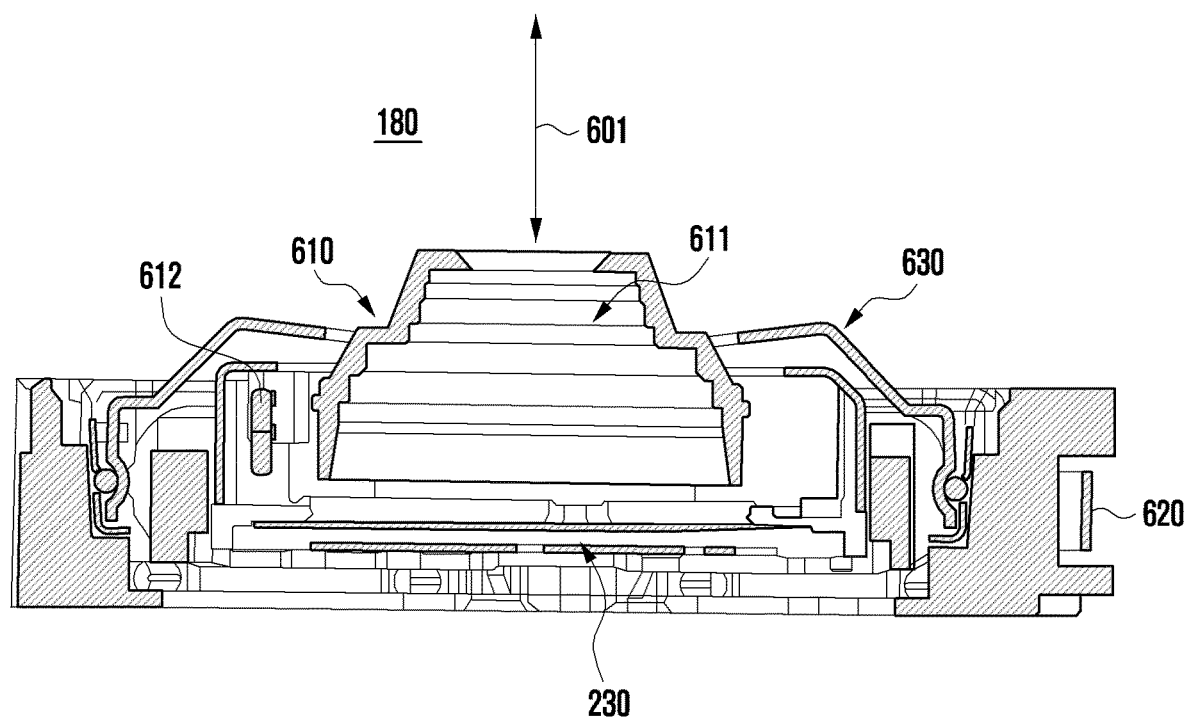
FIG. 7 is a cross-sectional view illustrating a camera included in an electronic device according to certain embodiments of the disclosure.

As can be seen, the camera 180 has a small space for movement. Accordingly, there may be limited space for movement of the camera 180 to cause the optical axis to coincide with the vertical axis. FIG. 6 is a perspective view transparently in part illustrating a camera 180 included in an electronic device 101 according to certain embodiments of the disclosure. FIG. 7 is a cross-sectional view illustrating a camera 180 included in an electronic device 101 according to certain embodiments of the disclosure. FIGS. 8 to 10B are exploded perspective views illustrating the camera 180 of FIG. 6.

Referring to FIGS. 6 to 10B, the camera 180 according to certain embodiments may include a camera module 610, an image stabilizer actuator 620, a rotation guide 630, and a module housing 640.

The camera module 610 may include, for example, a lens assembly 611 (e.g., the lens assembly 210 in FIG. 2). The camera module 610 may further include an image sensor (e.g., the image sensor 230 in FIG. 2 or FIG. 7) disposed under the lens assembly 611 (e.g., the lens assembly 210 in FIG. 2).

The lens assembly 611 of the camera module 610 may have an optical axis 601 orthogonal to the image sensor 230.

A focal length may be adjusted by, for example, a zoom magnification. That is, the focal length may be determined differently depending on the zoom magnification.

The electronic device 101 may identify, as a focus position, a position of a focus lens (e.g., the lens assembly 611) for focusing on a targeted object. The focus position refers to a position at which the lens (e.g., the lens assembly 611) is moved in response to proximity, telephoto, or the like and then placed to focus on the targeted object.

In order to perform an autofocus function, the camera module 610 may use a motor to move the lens assembly 611 included therein toward or away from the image sensor 230 under the control of the image signal processor (260 in FIG. 2) and/or the processor (120 in FIG. 1). According to some embodiments, a separate autofocus module may directly control the lens assembly 611 in order to quickly perform the autofocus function. The autofocus module, which is directly connected to the lens assembly 611, may calculate the focus position based on light acquired through the lens assembly 611 and thereby control the lens assembly 611. A focus control module can comprise, for example, an autofocus module. The autofocus module can include a sensor that senses the focus position for the object being photographed and a motor that moves the lens assembly with respect to the image sensor to achieve focus.

The camera module 610 may further include a lens carrier 612 (see FIG. 7) for moving the lens assembly 611. The lens assembly 611 is coupled to the lens carrier 612 and may move in the direction of the optical axis 601 by the movement of the lens carrier 612.

The lens carrier 612 may include, for example, a magnet and a coil. Under the control of the image signal processor 260 and/or the processor 120, the lens carrier 612 may control the electromagnetic force by controlling the current passing through the coil and also move the lens assembly 611 in the direction of the optical axis 601 by using Lorentz force resulting from the electromagnetic force.

Based on the position of the lens assembly 611 during focusing, the range within which camera rotation about axis 601, 602, and 603 is determined.

Figure 8:
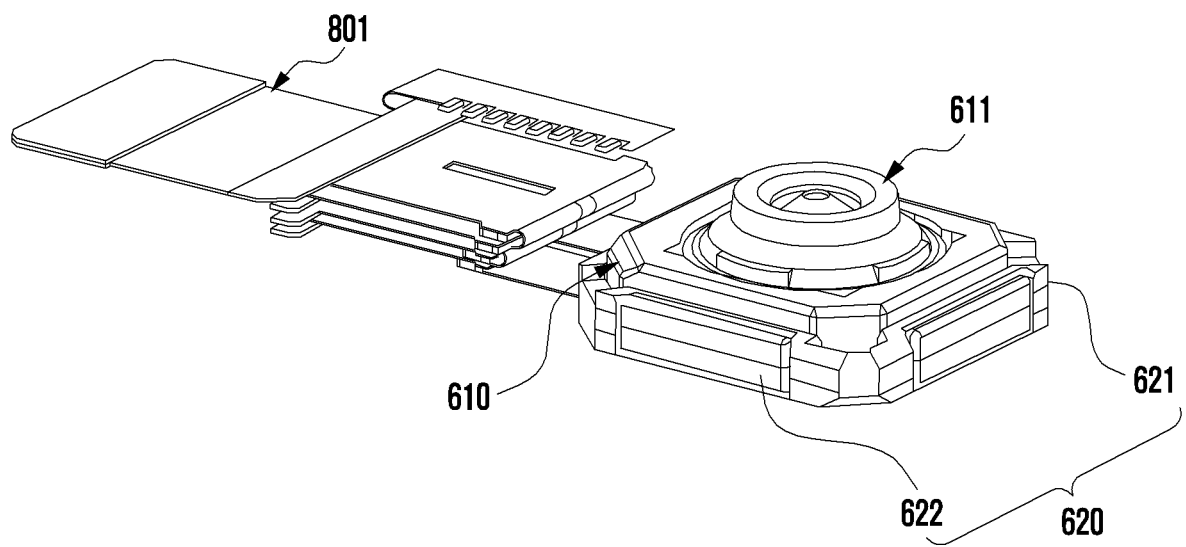
FIGS. 8 to 10B are exploded perspective views illustrating the camera of FIG. 6.

The image stabilizer actuator 620 may include, for example, a first actuator 621 (see FIG. 8) and a second actuator 622 (see FIG. 8).

The camera 180 may detect the motion (e.g., shake) of the camera 180 or of the electronic device 101 by using a gyro sensor (not shown) or an acceleration sensor (not shown) disposed inside or outside the camera.

Using the first actuator 621 and/or the second actuator 622, the image stabilizer actuator 620 may actuate the camera module 610 to perform a rotational motion with respect to a first lateral axis 602 orthogonal to the optical axis 601 and/or a second lateral axis 603 orthogonal to the optical axis 601. The first lateral axis 602 and the second lateral axis 603 may meet substantially perpendicular to each other on a plane orthogonal to the optical axis 601. The rotational motion of the camera module 610 is not limited to a 2-axis rotational motion with respect to the first and second lateral axes 602 and 603. In some embodiments, a 3-axis rotational motion about the first and second lateral axes 602 and 603 and a third axis corresponding to the optical axis 601 may also be possible.

Each of the first and second actuators 621 and 622 may be composed of a magnet and a coil, thus moving according to a magnetic field. Under the control of the image signal processor 260 and/or the processor 120, the first and second actuators 621 and 622 may control the electromagnetic force by controlling the current passing through the coil and, by using Lorentz force resulting from the electromagnetic force, actuate the camera module 610 to be rotated about the first lateral axis 602 and/or the second lateral axis 603.

According to certain embodiments, the 3-axis rotational motion related to the motion of the camera module 610 may include a yawing motion, a pitching motion, and a rolling motion. For example, a motion related to the first lateral axis 602 may be referred to as a yawing motion, and a motion related to the second lateral axis 603 may be referred to as a pitching motion. Additionally, a motion related to the third axis (e.g., the optical axis 601) may be referred to as a rolling motion. According to certain embodiments, the third axis may be an axis perpendicular to an orthogonal plane related to the yawing motion and the pitching motion.

According to certain embodiments, the electronic device 101 may be implemented to utilize various image stabilization techniques. In one example, the electronic device 101 may control the motion of the camera module 610 through the image stabilizer actuator 620. In another example, the electronic device 101 may further apply the lens shift technique. In still another example, the electronic device 101 may further apply both the lens shift technique and the image sensor shift technique.

Referring to FIG. 8, the camera module 610 may further include a flexible printed circuit board (FPCB) 801 that may transmit an image acquired through the image sensor 230 or transmit/receive a control signal to/from the image signal processor (260 in FIG. 2) and/or the processor (120 in FIG. 1). For example, the position information of the lens assembly during focusing can be provided from the camera module 610 to the processor. The processor can then determine a range within which rotational movement for correcting shake of the camera module 610 is permitted.

Figure 9:
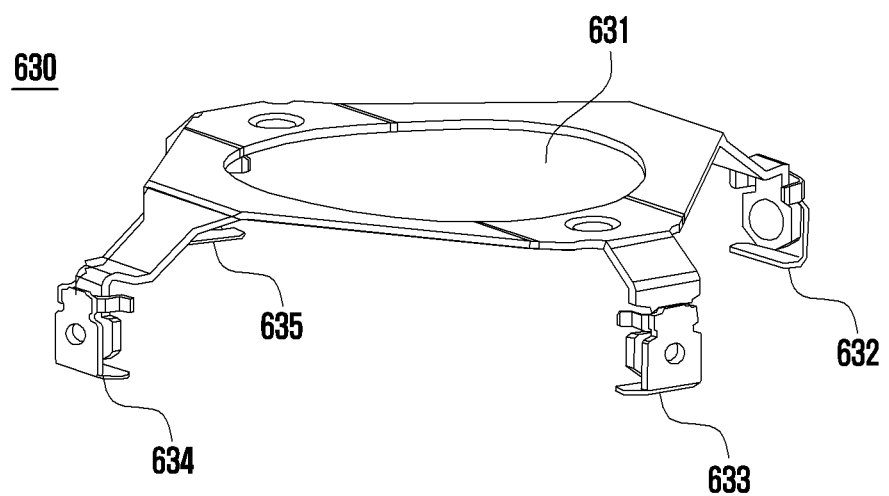

Referring to FIG. 9, the rotation guide 630 may be combined with the module housing (640 in FIG. 6) and may provide a rotation guide for the camera module 610 being moved by the image stabilizer actuator 620. The rotation guide 630 may include an opening 631 and one or more support parts 632, 633, 634, and 635.

The opening 631 may prevent the camera module 610, being rotated, from escaping to the outside of the rotation guide 630. The support parts 632, 633, 634, and 635 may be combined with the module housing 640 and may enable the rotation guide 630 to prevent the camera module 610 from being separated.

Figure 10A:
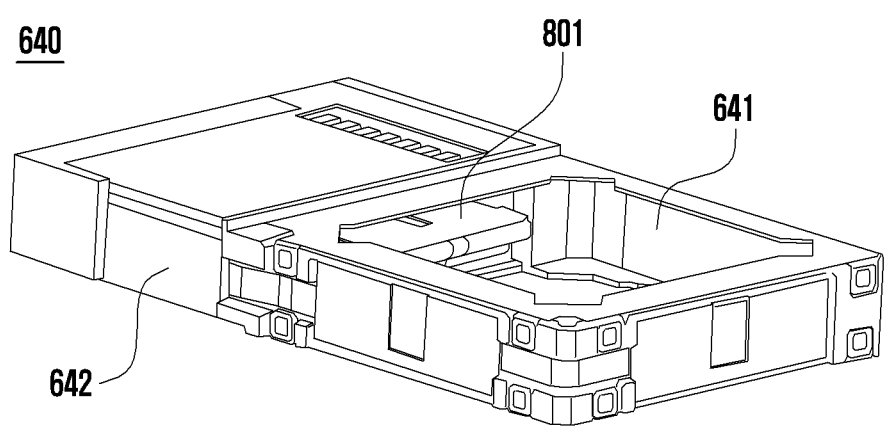
Figure 10B:
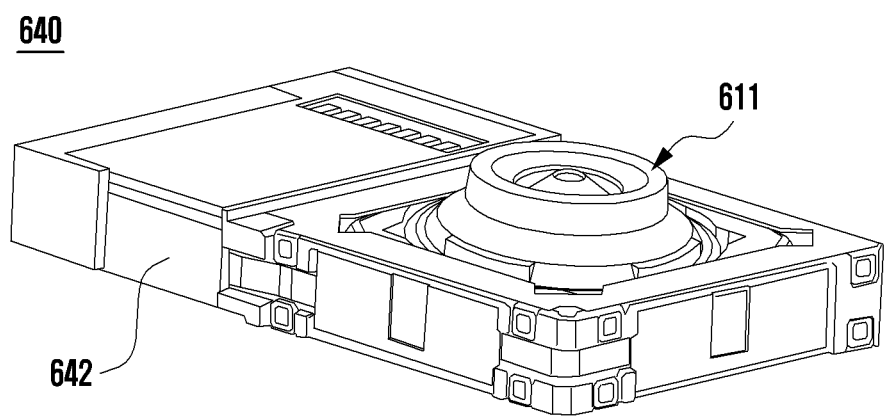

Referring to FIGS. 10A and 10B, the module housing 640 may provide a structure for accommodating the camera module 610, the image stabilizer actuator 620, and the rotation guide 630. The module housing 640 may be combined with at least a portion of the electronic device 101. The module housing 640 may include, for example, a container housing 641 and a connector housing 642. The container housing 641 may be at least partially opened and may accommodate the camera module 610 at least in part. The connector housing 642 may accommodate and protect the FPCB 801 connected to the camera module 610. Although the FPCB 801 is actually connected to the camera module 610 as shown in FIG. 8, FIG. 10A illustrates only a part of the FPCB 801 without the camera module 610 in order to clearly show that the connector housing 642 accommodates the FPCB 801.

Figure 11A:
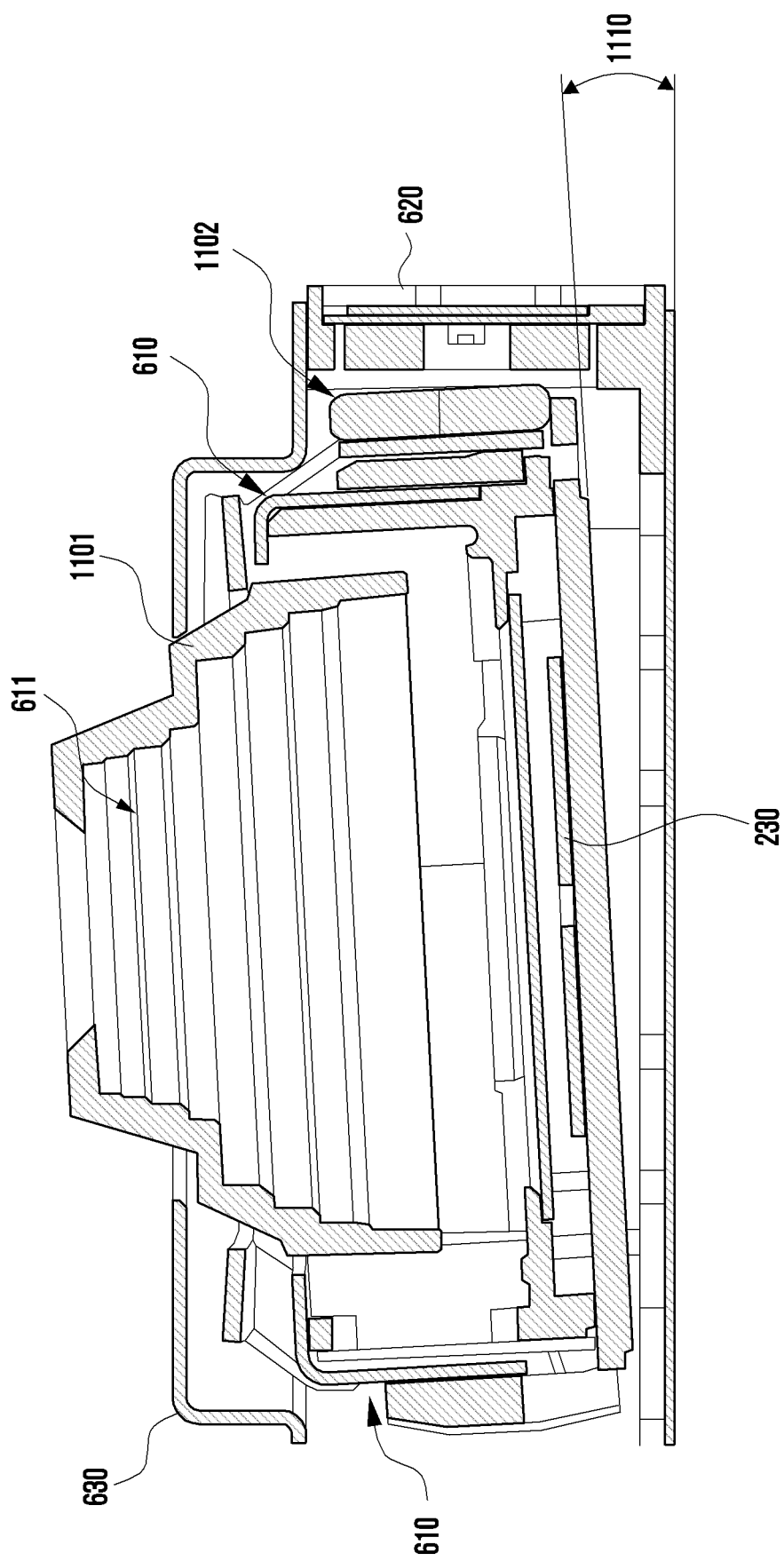
FIGS. 11A and 11B are diagrams illustrating one or more camera module stoppers according to certain embodiments of the disclosure.
Figure 11B:
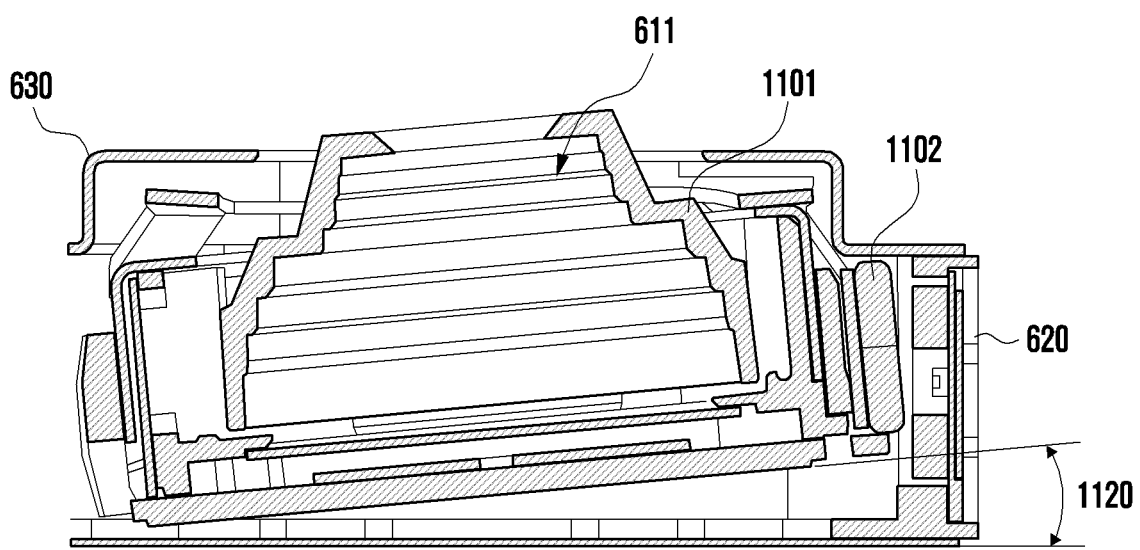
Figure 11C:
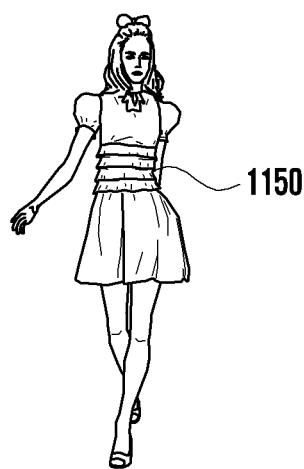
FIGS. 11C and 11D are diagrams illustrating the movement of a lens assembly for matching a focal length to an object according to certain embodiments of the disclosure.
Figure 11C:
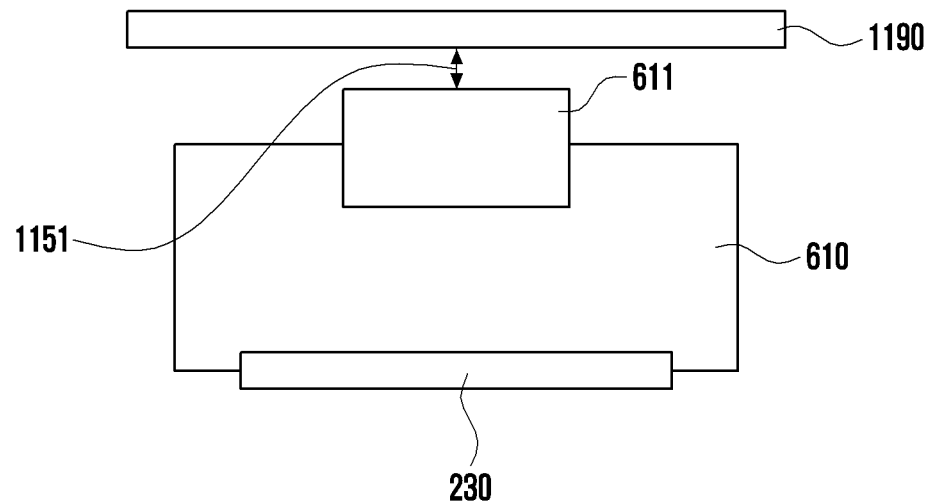
Figure 11D:
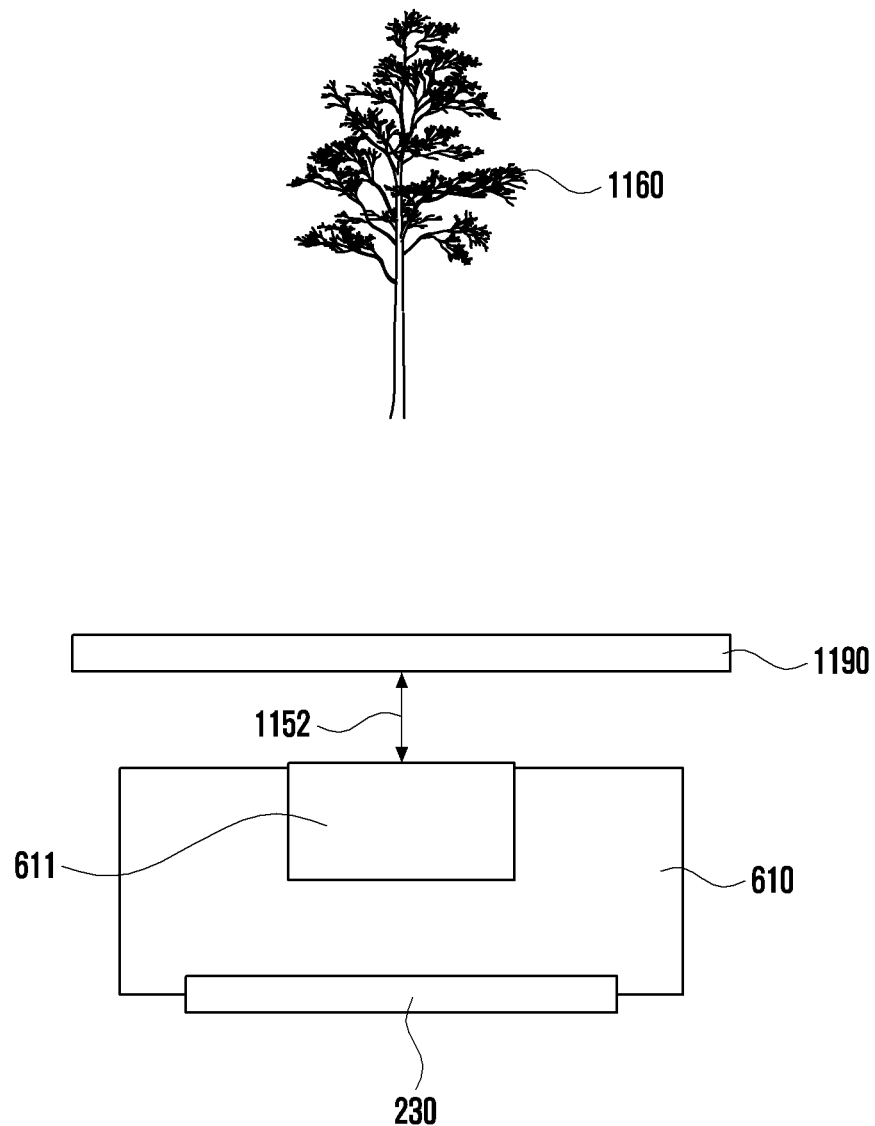

FIGS. 11A and 11B are diagrams illustrating one or more camera module stoppers 1101 and 1102 according to certain embodiments of the disclosure. FIGS. 11C and 11D are diagrams illustrating the movement of a lens assembly 611 for matching a focal length to an object according to certain embodiments of the disclosure. The camera module stoppers 1101 and 1102 of the camera module 610 shown in FIGS. 11A and 11B may also be included in the camera module shown in FIGS. 5 to 10B.

As the lens assembly 611 moves towards the cover glass 1190 to focus, the range of movement 1110, 1120 is reduced to avoid the camera module 611 making contact with the cover glass 1190. Accordingly, the processor selects different ranges of movement to correct shake. Therefore, based on the position of the lens assembly, the processor determines a range within which the camera module 611 can be moved to correct for shake.

When the camera module 610 performs a rotational motion by image stabilizer actuator 620, the camera module stoppers 1101 and 1102 may be in contact with at least a part of the rotation guide 630 and thereby limit a movement angle of the camera module 610.

A first camera module stopper 1101 may be disposed as at least a part of the lens assembly 611. When the lens assembly 611 is away from the image sensor 230 along the optical axis 601 (e.g., a close-up shot mode), and when the camera module 610 rotates about the first lateral axis 602 or the second lateral axis 603 by the image stabilizer actuator 620 to compensate for shake, the first camera module stopper 1101 may be in contact with at least a part of the rotation guide 630 and thereby limit a movement angle 1110 of the camera module 610. In order to adjust the focal length to the targeted object in the close-up shot mode, the electronic device 101 may move the lens assembly 611 to be as far away as possible from the image sensor 230. Referring to FIG. 11B, a second camera module stopper 1102 may be disposed as at least a part of a lateral surface of the camera module 610. When the lens assembly 611 is close to the image sensor 230 along the optical axis 601 (e.g., a distant shot mode), and when the camera module 610 rotates about the first lateral axis 602 or the second lateral axis 603 by the image stabilizer actuator 620 to compensate for shake, the second camera module stopper 1102 may be in contact with at least a part of the rotation guide 630 and thereby limit a movement angle 1120 of the camera module 610.

Referring to FIG. 11C, when the camera module 610 photographs a near object 1150 (i.e., a close-up shot mode), the lens assembly 611 moves toward the object 1150 in order to focus on the object 1150. That is, the lens assembly 611 is moved away from the image sensor 230 and is closer to a transparent cover or cover glass 1190.

Because the lens assembly 611 is located relatively close to the object 1150, in order to perform a focus operation in the close-up shot mode, a distance 1151 between the lens assembly 611 and the transparent cover or cover glass 1190 is relatively small. In this disclosure, this distance will be referred to as a first distance 1151.

If the movement angle of the camera module 610 is large, the lens assembly 611 may contact the transparent cover or cover glass 1190 due to the relatively small first distance 1151 in the close-up shot mode. Therefore, there may be restrictions on the motion of the camera module 610 for compensating for shake.

Referring to FIG. 11D, when the camera module 610 photographs a far object 1160 (i.e., a distant shot mode), the lens assembly 611 moves away from the object 1160 in order to focus on the object 1160. That is, the lens assembly 611 is moved toward the image sensor 230, and a distance 1152 between the lens assembly 611 and the transparent cover or cover glass 1190 is relatively large. In this disclosure, this distance will be referred to as a second distance 1152. The second distance 1152 is greater than the first distance 1151. Thus, the movement angle of the camera module 610 is larger in the distant shot mode than in the close-up shot mode. As such, the movement angle (e.g., 1110 or 1120 in FIG. 11A or 11B) of the camera module 610 may be determined differently depending on the position of the lens assembly 611.

Figure 12:
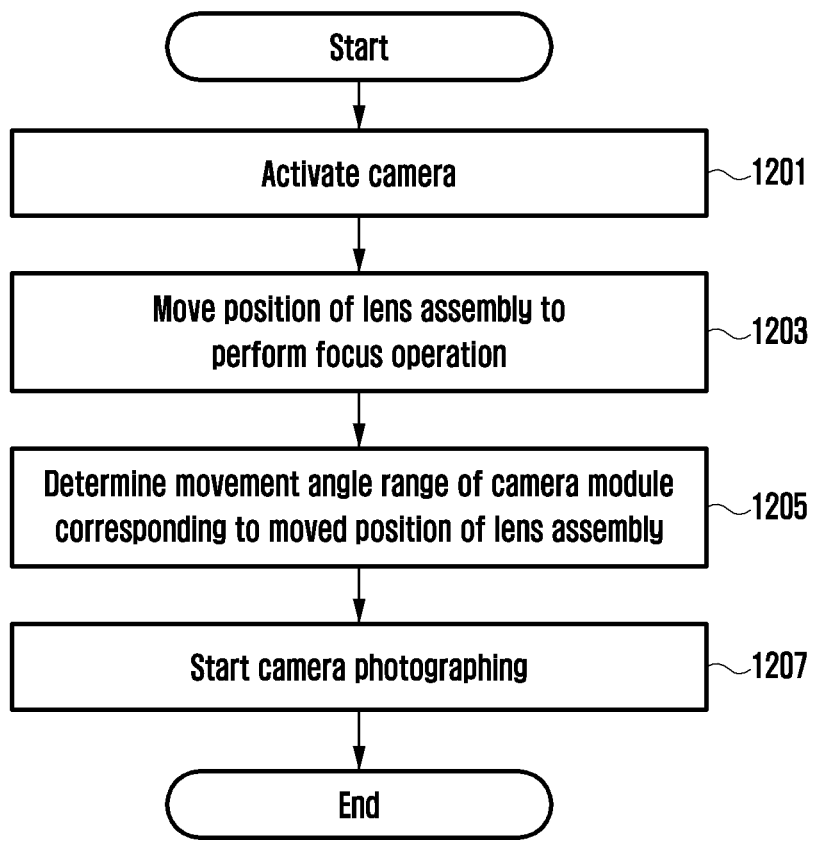
FIG. 12 is a flow diagram illustrating a method for controlling a motion of a camera included in an electronic device according to certain embodiments of the disclosure.

FIG. 12 is a flow diagram illustrating a method for controlling a motion of the camera 180 included in the electronic device 101 according to certain embodiments of the disclosure.

Referring to FIG. 12, at operation 1201, the electronic device 101 may activate the camera 180 under the control of the image signal processor 260 and/or the processor 120.

At operation 1203, the electronic device 101 may move the position of the lens assembly 611 to perform a focus operation of focusing on a targeted object, based on a distance between the object and the image sensor 230, under the control of the image signal processor 260 and/or the processor 120. According to an embodiment, the camera module 610 may be moved to compensate for shake.

According to certain embodiments, at the operation 1203, the electronic device 101 may move the lens assembly 611 along the optical axis 601 to be closer to or away from the image sensor 230 under the control of the image signal processor 260 and/or the processor 120. This is the focus operation of focusing on the object to obtain a clear image of the object.

At operation 1205, the electronic device 101 may determine a movement angle range of the camera module 610 corresponding to the moved position of the lens assembly 611 in the focus operation under the control of the image signal processor 260 and/or the processor 120.

According to certain embodiments, at the operation 1205, the electronic device 101 may determine the moved position of the lens assembly 611 in the focus operation, based on predefined sections, under the control of the image signal processor 260 and/or the processor 120.

According to certain embodiments, the moved position of the lens assembly 611 may be determined by itself or based on the position of the camera module 610 including the lens assembly 611 or the position of the camera 180. In addition, the moved position of the lens assembly 611 may be determined from the moving speed of the lens assembly 611. Also, the moved position of the lens assembly 611 may be determined on the basis of a user input such as zoom in or zoom out. For example, when a user enters a zoom-in input, the electronic device 101 may determine in advance the moved position of the lens assembly 611 based on the zoom-in input before the lens assembly 611 moves.

According to certain embodiments, when a user directly selects a specific zoom, the electronic device 101 may obtain in advance the moved position of the lens assembly 611 corresponding to the selected specific zoom. Then, based on the obtained position of the lens assembly 611, the electronic device 101 may determine the movement angle (e.g., 1110 in FIG. 11A or 1120 in FIG. 11B) of the camera module 610.

In case of determining the moved position of the lens assembly 611 as one of the predefined sections in the focus operation, the electronic device 101 may determine, at the operation 1205, the movement angle range of the camera module 610 corresponding to the determined section under the control of the image signal processor 260 and/or the processor 120.

According to certain embodiments, at the operation 1205, the electronic device 101 may determine the maximum movement angle of the camera module 610 corresponding to the moved position of the lens assembly 611 in the focus operation under the control of the image signal processor 260 and/or the processor 120.

For example, the maximum movement angle of the camera module 610 may be the maximum angle to which the lens assembly 611 can move without contact with a camera window (not shown).

For example, the maximum movement angle of the camera module 610 may be the maximum angle to which at least a portion of the camera module 610 can move without contact with at least a portion of a mechanical structure (e.g., the module housing 640 or the container housing 641 in FIG. 10A) inside the electronic device 101.

According to certain embodiments, at the operation 1205, information on the position of the lens assembly 611 may be determined based on at least one of a focus position determined by a focus adjustment operation, a physical position of at least one lens in the lens assembly 611, or a numerical value determined by a designated focal length. Based on the determined position information of the lens assembly 611, the electronic device 101 may predict a location of a portion where the lens assembly 611 collides with some members of the camera 180.

According to certain embodiments, at the operation 1205, information on the position of the lens assembly 611 may be determined based on a focal length determined by the focus adjustment operation.

At operation 1207, the electronic device 101 may start camera photographing under the control of the image signal processor 260 and/or the processor 120.

According to certain embodiments, at the operation 1207, under the control of the image signal processor 260 and/or the processor 120, the electronic device 101 may move the camera module 610 and then start camera photographing when the virtual axis 520 (see FIG. 5) connecting a targeted object and the camera 180 coincides with the optical axis 521 (see FIG. 5) of the camera 180. If the virtual axis 520 does not coincide with the optical axis 521 due to shake, a blurred image may be captured. Therefore, at the operation 1207, the electronic device 101 may tilt the optical axis 521 to match the virtual axis 520 so as to compensate for shake, so that the image sensor 230 may capture an image without blurring due to shake.

For example, the operation of starting camera photographing may include an operation of displaying an image acquired from the camera 180 as a preview image on a display (e.g., display device 160) of the electronic device 101.

Under the control of the image signal processor 260 and/or the processor 120, the electronic device 101 may detect the shake of the camera 180, move the camera module 610 to compensate for the detected shake, and capture an image while minimizing the effect of the shake.

According to certain embodiments, at the operation 1207, the electronic device 101 may detect the motion of the camera 180 or the electronic device 101 through a sensor (e.g., a gyro sensor, an acceleration sensor) included in a sensor module (e.g., the sensor module 176 in FIG. 1) disposed inside or outside the camera 180 under the control of the image signal processor 260 and/or the processor 120.

At the operation 1207, under the control of the image signal processor 260 and/or the processor 120, the electronic device 101 may move the camera module 610 within the determined movement angle range when any shake of the camera 180 is detected.

According to certain embodiments, in order to prevent an image from being blurred due to the shake of the camera 180, the electronic device 101 may move the camera module 610 in a direction that compensates for the shake of the camera 180 (e.g., in a direction opposite to the shake of the electronic device 101).

According to certain embodiments, the camera module 610 may move so that an image of the targeted object is not blurred due to the shake of the camera 180 or the electronic device 101. When the shake of the camera 180 is detected, the electronic device 101 may control at the operation 1207 the image stabilizer actuator 620 within the determined movement angle range. The image stabilizer actuator 620 may actuate the camera module 610 to perform a rotational motion with respect to the first lateral axis 602 orthogonal to the optical axis 601 and/or the second lateral axis 603 orthogonal to the optical axis 601 under the control of the image signal processor 260 and/or the processor 120.

According to certain embodiments, at the operation 1207, the electronic device 101 may move the camera module 610 based on the movement angle determined depending on the focal length. For example, the electronic device 101 may identify the focal length to a targeted object and move the camera module 610 in response to the identified focal length. Specifically, if the focal length is a first focal length, the camera module 610 may be moved within a first range of the movement angle to compensate for shake. If the focal length is a second focal length, the camera module 610 may be moved within a second range of the movement angle to compensate for shake. The focal length is a distance between a reference point and a focal point at which beams of light passing through the lens meet. For example, when the zoom magnification is in a first magnification state, a distance between the lens and the focal point may be referred to as a first focal length, and when the zoom magnification is in a second magnification state, a distance between the lens and the focal point may be referred to as a second focal length. The electronic device 101 may identify the focal length to the targeted object in real time and adjust the movement angle of the camera module 610 differently depending on the identified focal length. The focal length may be changed in response to a user input or may be automatically calculated by the camera 180.

Figure 13:
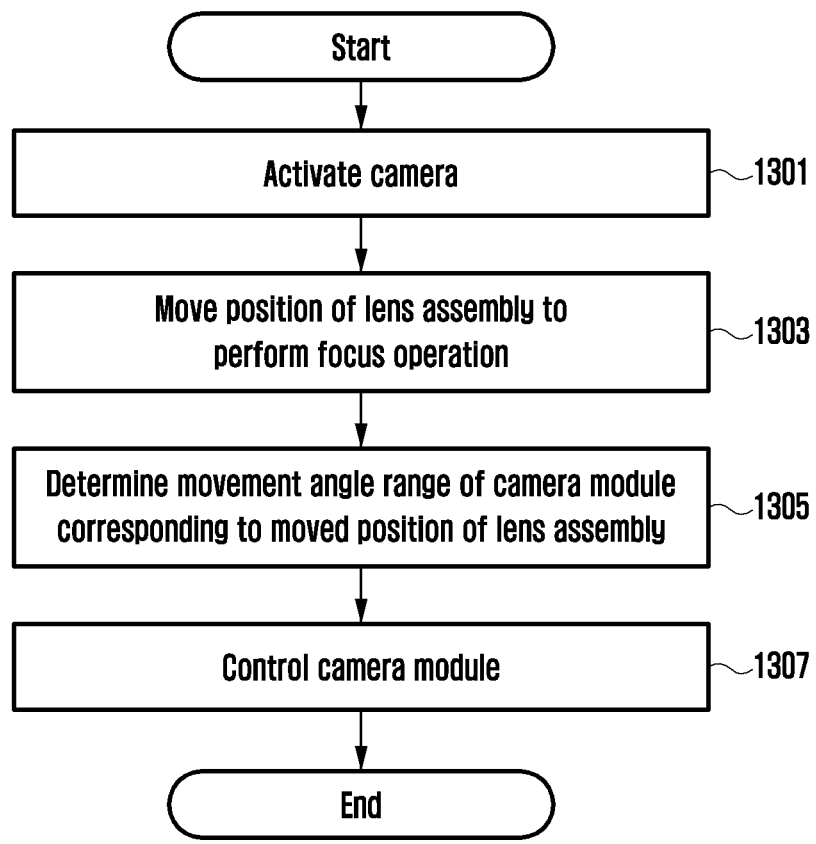
FIG. 13 is a flow diagram illustrating a method for controlling a motion of a camera included in an electronic device according to certain embodiments of the disclosure.

FIG. 13 is a flow diagram illustrating a method for controlling a motion of the camera 180 included in the electronic device 101 according to certain embodiments of the disclosure.

Referring to FIG. 13, at operation 1301, the electronic device 101 may activate the camera 180 under the control of the image signal processor 260 and/or the processor 120. Upon activating the camera 180 at the operation 1301, the electronic device 101 may capture an image.

In certain embodiments, the operation of capturing an image may be an operation of obtaining an image through the camera 180 of the electronic device 101.

In certain embodiments, the operation of capturing an image may be an operation of displaying an image acquired from the camera 180 as a preview image on a display (e.g., the display device 160) of the electronic device 101.

At operation 1303, the electronic device 101 may move the position of the lens assembly 611 to perform a focus operation of focusing on a targeted object, based on a distance between the object and the image sensor 230, under the control of the image signal processor 260 and/or the processor 120. According to an embodiment, the camera module 610 may be moved to compensate for shake.

According to certain embodiments, at the operation 1303, the electronic device 101 may move the lens assembly 611 along the optical axis 601 to be closer to or away from the image sensor 230 under the control of the image signal processor 260 and/or the processor 120. This is the focus operation of focusing on the object to obtain a clear image of the object.

At operation 1305, the electronic device 101 may determine a movement angle range of the camera module 610 corresponding to the moved position of the lens assembly 611 in the focus operation under the control of the image signal processor 260 and/or the processor 120.

According to certain embodiments, at the operation 1305, the electronic device 101 may determine the moved position of the lens assembly 611 in the focus operation, based on predefined sections, under the control of the image signal processor 260 and/or the processor 120, and thereby determine the corresponding movement angle range of the camera module 610.

According to certain embodiments, the moved position of the lens assembly 611 may be determined by itself or based on the position of the camera module 610 including the lens assembly 611 or the position of the camera 180. In addition, the moved position of the lens assembly 611 may be determined from the moving speed of the lens assembly 611. Also, the moved position of the lens assembly 611 may be determined on the basis of a user input such as zoom in or zoom out. For example, when a user enters a zoom-in input, the electronic device 101 may determine in advance the moved position of the lens assembly 611 based on the zoom-in input before the lens assembly 611 moves. According to certain embodiments, when a user directly selects a specific zoom, the electronic device 101 may obtain in advance the moved position of the lens assembly 611 corresponding to the selected specific zoom. Then, based on the obtained position of the lens assembly 611, the electronic device 101 may determine the movement angle (e.g., 1110 in FIG. 11A or 1120 in FIG. 11B) of the camera module 610.

In case of determining the moved position of the lens assembly 611 as one of the predefined sections in the focus operation, the electronic device 101 may determine, at the operation 1305, the movement angle range of the camera module 610 corresponding to the determined section under the control of the image signal processor 260 and/or the processor 120.

According to certain embodiments, at the operation 1305, the electronic device 101 may determine the maximum movement angle of the camera module 610 corresponding to the moved position of the lens assembly 611 in the focus operation under the control of the image signal processor 260 and/or the processor 120.

For example, the maximum movement angle of the camera module 610 may be the maximum angle to which the lens assembly 611 can move without contact with a camera window (not shown).

For example, the maximum movement angle of the camera module 610 may be the maximum angle to which at least a portion of the camera module 610 can move without contact with at least a portion of a mechanical structure (e.g., the module housing 640 or the container housing 641 in FIG. 10A) inside the electronic device 101.

According to certain embodiments, at the operation 1305, information on the position of the lens assembly 611 may be determined based on at least one of a focus position determined by a focus adjustment operation, a physical position of at least one lens in the lens assembly 611, or a numerical value determined by a designated focal length. Based on the determined position information of the lens assembly 611, the electronic device 101 may predict a location of a portion where the lens assembly 611 collides with some members of the camera 180.

According to certain embodiments, at the operation 1305, information on the position of the lens assembly 611 may be determined based on a focal length determined by the focus adjustment operation.

At operation 1307, the electronic device 101 may control the camera module 610 under the control of the image signal processor 260 and/or the processor 120.

Referring to FIGS. 5 and 11A to 11D, in certain embodiments, the electronic device 101 may control the camera module 610 at the operation 1307 such that the virtual axis 520 connecting a targeted object and the center of the camera 180 coincides with the optical axis 521 of the camera 180.

According to certain embodiments, at the operation 1307, under the control of the image signal processor 260 and/or the processor 120, the electronic device 101 may move the camera module 610 to match the virtual axis 520 connecting the object and the camera 180 to the optical axis 521 of the camera 180.

If the virtual axis 520 does not coincide with the optical axis 521 due to shake, a blurred image may be captured. Therefore, at the operation 1307, the electronic device 101 may tilt the optical axis 521 to match the virtual axis 520 so as to compensate for shake, so that the image sensor 230 may capture an image without blurring due to shake.

Under the control of the image signal processor 260 and/or the processor 120, the electronic device 101 may detect the shake of the camera 180, move the camera module 610 to compensate for the detected shake, and capture an image while minimizing the effect of the shake.

According to certain embodiments, at the operation 1307, the electronic device 101 may detect the motion of the camera 180 or the electronic device 101 through a sensor (e.g., a gyro sensor, an acceleration sensor) included in a sensor module (e.g., the sensor module 176 in FIG. 1) disposed inside or outside the camera 180 under the control of the image signal processor 260 and/or the processor 120.

At the operation 1307, under the control of the image signal processor 260 and/or the processor 120, the electronic device 101 may move the camera module 610 within the determined movement angle range when any shake of the camera 180 is detected.

According to certain embodiments, in order to prevent an image from being blurred due to the shake of the camera 180, the electronic device 101 may move the camera module 610 in a direction that compensates for the shake of the camera 180 (e.g., in a direction opposite to the shake of the electronic device 101).

According to certain embodiments, the camera module 610 may move so that an image of the targeted object is not blurred due to the shake of the camera 180 or the electronic device 101.

When the shake of the camera 180 is detected, the electronic device 101 may control at the operation 1307 the image stabilizer actuator 620 within the determined movement angle range. The image stabilizer actuator 620 may actuate the camera module 610 to perform a rotational motion with respect to the first lateral axis 602 orthogonal to the optical axis 601 and/or the second lateral axis 603 orthogonal to the optical axis 601 under the control of the image signal processor 260 and/or the processor 120.

According to certain embodiments, at the operation 1307, the electronic device 101 may move the camera module 610 based on the movement angle determined depending on the focal length. For example, the electronic device 101 may identify the focal length to a targeted object and move the camera module 610 in response to the identified focal length. Specifically, if the focal length is a first focal length, the camera module 610 may be moved within a first range of the movement angle to compensate for shake. If the focal length is a second focal length, the camera module 610 may be moved within a second range of the movement angle to compensate for shake. The focal length is a distance between a reference point and a focal point at which beams of light passing through the lens meet. For example, when the zoom magnification is in a first magnification state, a distance between the lens and the focal point may be referred to as a first focal length, and when the zoom magnification is in a second magnification state, a distance between the lens and the focal point may be referred to as a second focal length. The electronic device 101 may identify the focal length to the targeted object in real time and adjust the movement angle of the camera module 610 differently depending on the identified focal length. The focal length may be changed in response to a user input or may be automatically calculated by the camera 180.

Figure 14A:
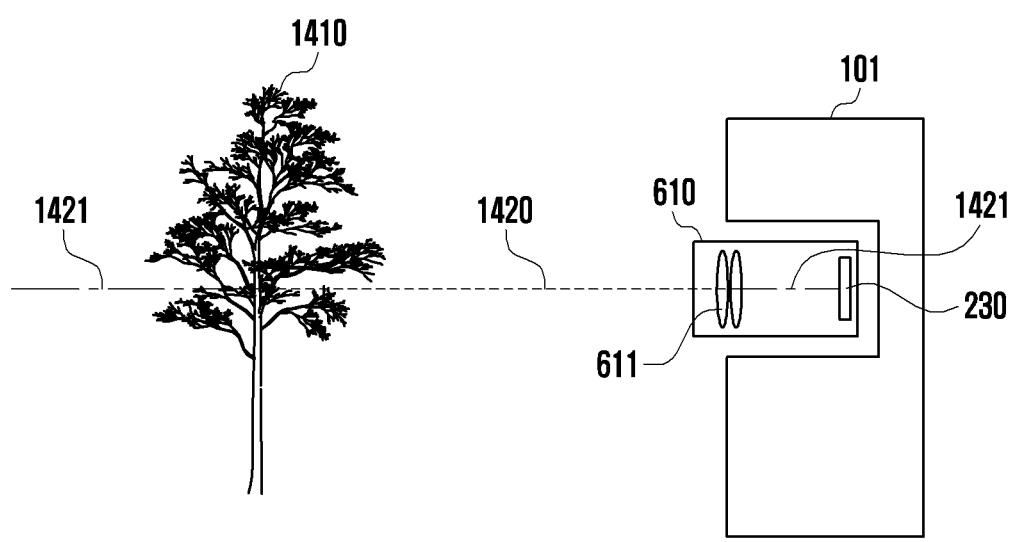
FIGS. 14A to 14C are diagrams illustrating a method for controlling a motion of a camera module included in an electronic device according to certain embodiments of the disclosure.
Figure 14B:
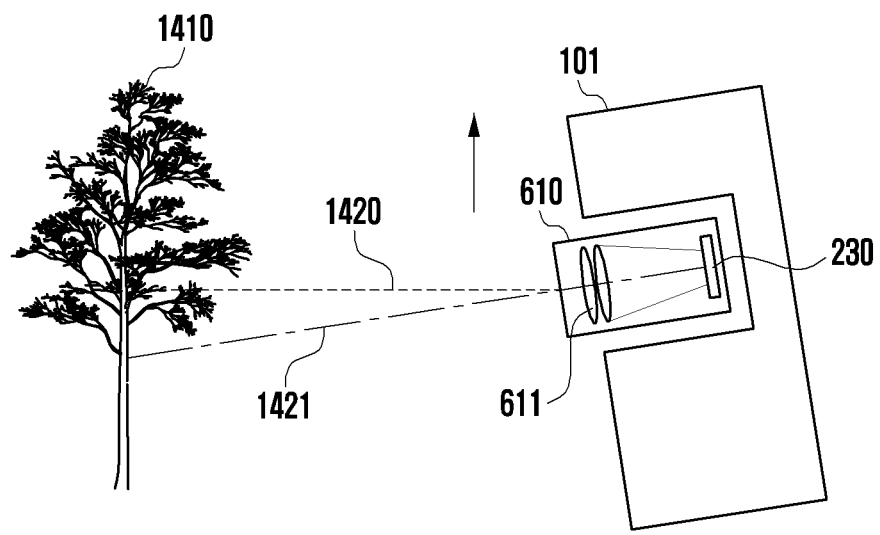
Figure 14C:
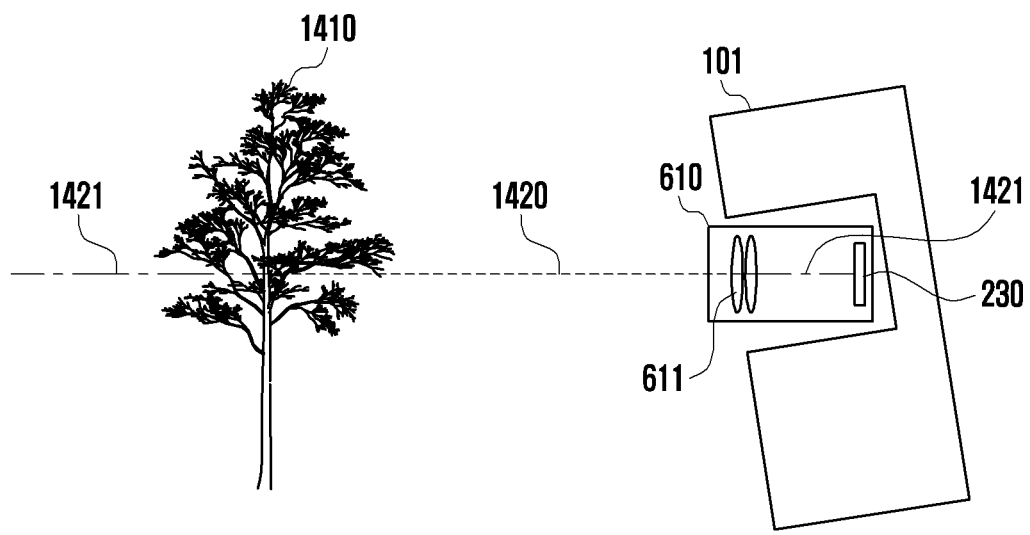

FIGS. 14A to 14C are diagrams illustrating a method for controlling a motion of the camera module 610 included in the electronic device 101 according to certain embodiments of the disclosure.

FIG. 14A illustrates an image capturing operation using the camera module 610 when no shake of the electronic device 101 occurs.

According to certain embodiments, the electronic device 101 may capture an image of a targeted object 1410 through the camera module 610. When the electronic device 101 does not shake, an image that is not blurred may be captured by the image sensor 230 of the camera module 610. That is, a virtual axis 1420 (e.g., the virtual axis 520 in FIG. 5) connecting the object 1410 and the center of the camera module 610 coincides with an optical axis 1421 (e.g., the optical axis 521 in FIG. 5 and the optical axis 601 in FIG. 6) of the lens assembly 611. In addition, the optical axis 1421 of the lens assembly 611 is orthogonal to the image sensor 230. Meanwhile, referring to FIGS. 14B and 14C, under the control of the image signal processor 260 and/or the processor 120, any shake of the electronic device 101 may be detected.

In FIG. 14B, according to certain embodiments, the virtual axis 1420 that connects the object 1410 and the center of the camera module 610 may not coincide with the optical axis 1421 of the assembly 611 due to the shake of the electronic device 101. When the virtual axis 1420 and the optical axis 1421 do not coincide with each other due to the shake of the electronic device 101, the image sensor 230 may capture a blurred image.

In FIG. 14C, according to certain embodiments, the electronic device 101 may control the camera module 610 such that the virtual axis 1420 and the optical axis 1421 coincide with each other. That is, the electronic device 101 (e.g., the image signal processor 260 and/or the processor 120) may move the camera module 610 to match the optical axis 1421 of the lens assembly 611 to the virtual axis 1420 connecting the object 1410 and the center of the camera module 610. When the optical axis 1421 of the lens assembly 611 is tilted due to the shake of the electronic device 101, the electronic device 101 may control (e.g., move) the camera module 610 such that the optical axis 1421 coincides with the virtual axis 1420. Based on this control, the image sensor 230 may capture an image without blurring. That is, the electronic device 101 may detect the shake of the camera module 610, move the camera module 610 to compensate for the detected shake, and capture an image while minimizing the effect of the shake. For example, when the electronic device 101 is shaken, the electronic device 101 may control the image stabilizer actuator 620 within a determined movement angle (e.g., the movement angle in FIG. 12 or 13). Thus, the image stabilizer actuator 620 may actuate the camera module 610 to perform a rotational motion with respect to the first lateral axis 602 orthogonal to the optical axis 601 and/or the second lateral axis 603 orthogonal to the optical axis 601.

However, it is noted that the range that camera module 610 can be moved to compensate for shake of the electronic device 101, is based on the position of the lens assembly 611.

Figure 15:
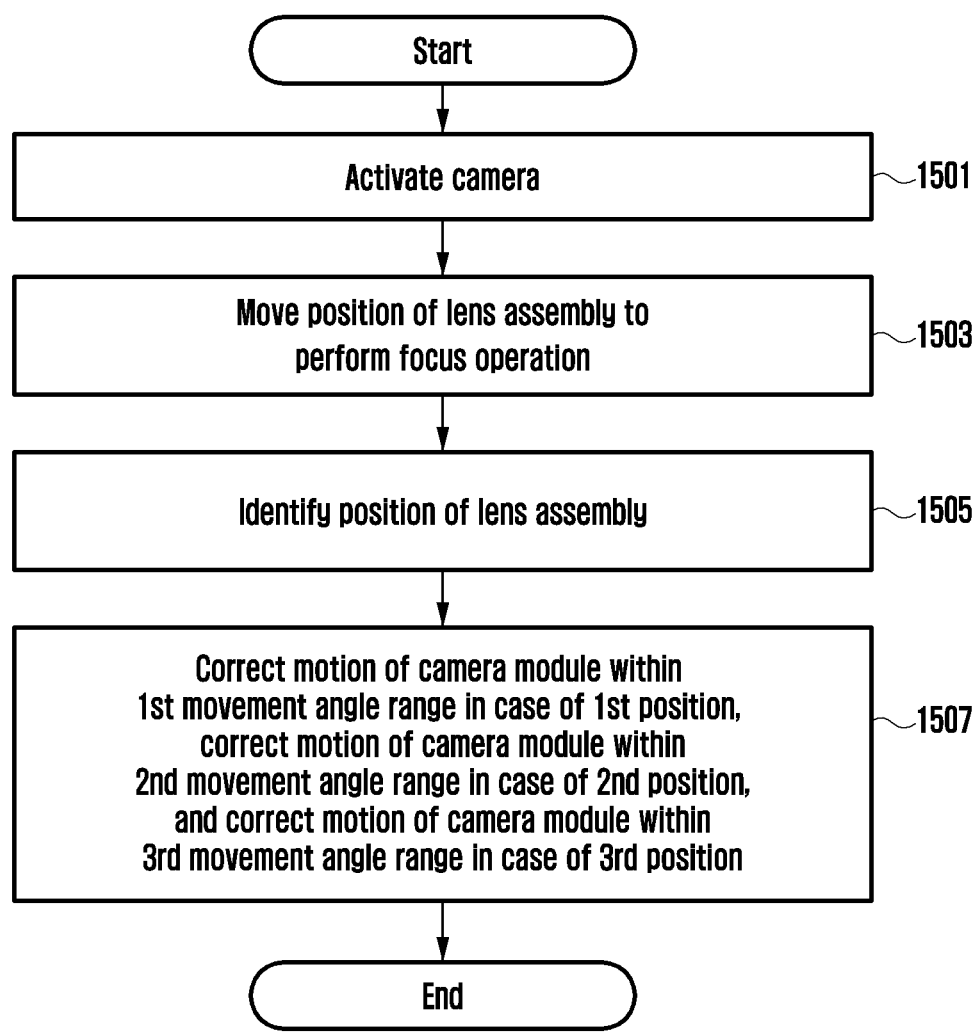
FIG. 15 is a flow diagram illustrating a method for controlling a motion of a camera included in an electronic device according to certain embodiments of the disclosure.
Figure 16:
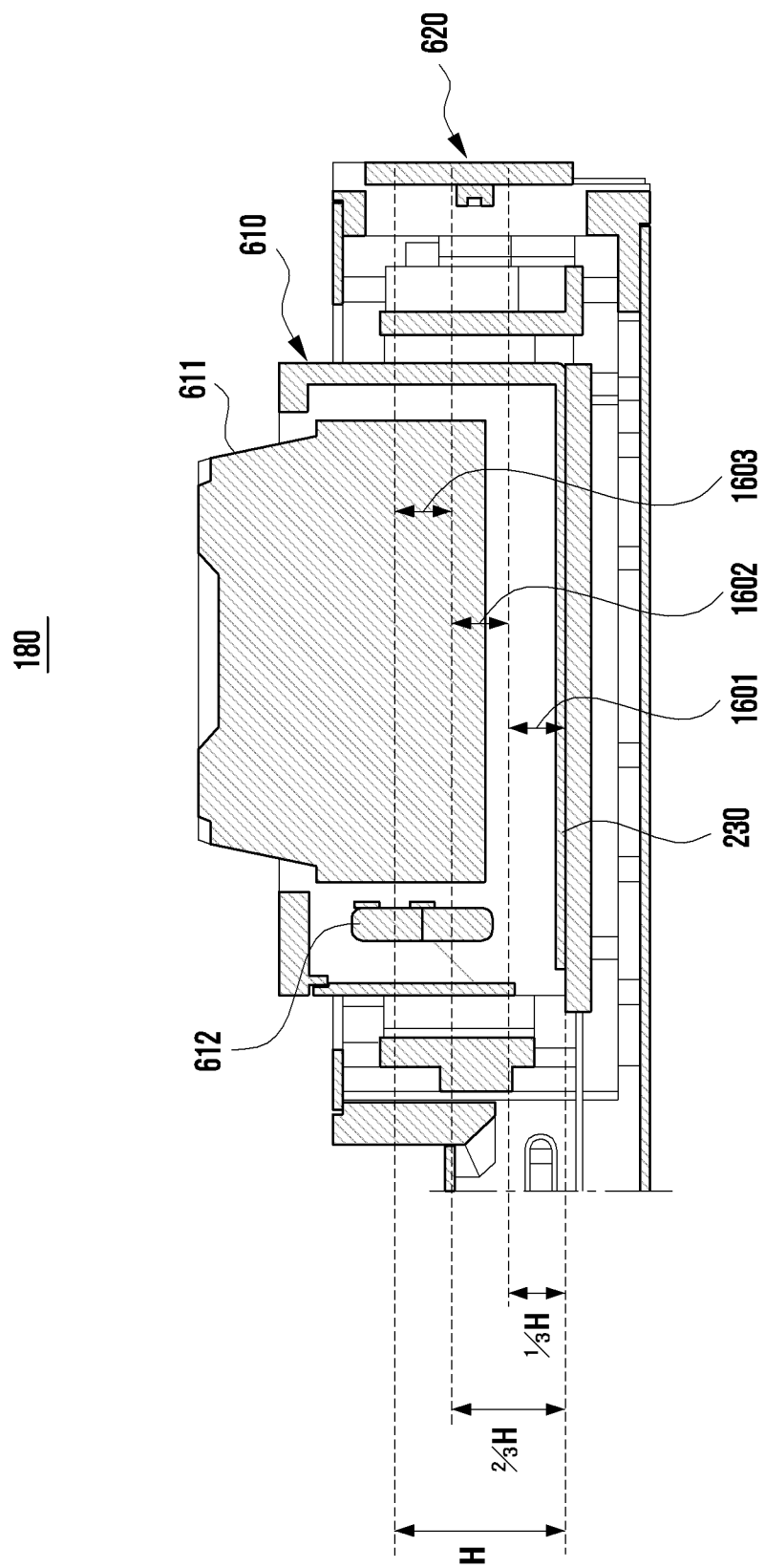
FIG. 16 is a diagram illustrating first to third moved positions of a lens assembly included in a camera according to certain embodiments of the disclosure.

FIG. 15 is a flow diagram illustrating a method for controlling a motion of the camera 180 included in the electronic device 101 according to certain embodiments of the disclosure. FIG. 16 is a diagram illustrating first to third moved positions of the lens assembly 611 included in the camera 180 according to certain embodiments of the disclosure.

Referring to FIG. 15, at operation 1501, the electronic device 101 may activate the camera 180 under the control of the image signal processor 260 and/or the processor 120. Upon activating the camera 180 at the operation 1501, the electronic device 101 may capture an image.

In certain embodiments, the operation of capturing an image may be an operation of obtaining an image through the camera 180 of the electronic device 101.

In certain embodiments, the operation of capturing an image may be an operation of displaying an image acquired from the camera 180 as a preview image on a display (e.g., the display device 160) of the electronic device 101.

At operation 1503, the electronic device 101 may move the position of the lens assembly 611 to perform a focus operation of focusing on a targeted object under the control of the image signal processor 260 and/or the processor 120.

According to certain embodiments, at the operation 1503, the electronic device 101 may move the lens assembly 611 along the optical axis 601 to be closer to or away from the image sensor 230 during the focus operation under the control of the image signal processor 260 and/or the processor 120. In addition, the lens assembly 611 may be combined with a lens carrier (e.g., the lens carrier 612 in FIG. 7 or 16) and may move in the direction of the optical axis 601 by a movement of the lens carrier 612.

At operation 1505, the electronic device 101 may identify the position of the lens assembly 611 moved in a focus operation under the control of the image signal processor 260 and/or the processor 120.

According to certain embodiments, at the operation 1505, information on the position of the lens assembly 611 may be determined based on at least one of a focus position determined by a focus adjustment operation, a physical position of at least one lens in the lens assembly 611, or a numerical value determined by a designated focal length. Based on the determined position information of the lens assembly 611, the electronic device 101 may predict a location of a portion where the lens assembly 611 collides with some members of the camera 180.

According to certain embodiments, at the operation 1505, information on the position of the lens assembly 611 may be determined based on a focal length determined by the focus adjustment operation under the control of the image signal processor 260 and/or the processor 120.

At operation 1507, when the moved position of the lens assembly 611 by the focus operation is a first position (e.g., 1601 in FIG. 16), the electronic device 101 may correct the motion of the camera module 610 within a first movement angle range corresponding to the first position under the control of the image signal processor 260 and/or the processor 120. For example, the first movement angle may be preset and stored within a range in which the lens assembly 611 does not collide with a mechanism disposed inside the electronic device 101. In order to compensate for any shake of the electronic device 101, the electronic device 101 may move the camera module 610 at a certain angle. If the moved position of the lens assembly 611 is the first position (e.g., 1601 in FIG. 16), the camera module 610 may be moved only within the first movement angle range.

At the operation 1507, when the moved position of the lens assembly 611 by the focus operation is a second position (e.g., 1602 in FIG. 16), the electronic device 101 may correct the motion of the camera module 610 within a second movement angle range corresponding to the second position under the control of the image signal processor 260 and/or the processor 120. For example, the second movement angle may be preset and stored within a range in which the lens assembly 611 does not collide with a mechanism disposed inside the electronic device 101. In order to compensate for any shake of the electronic device 101, the electronic device 101 may move the camera module 610 at a certain angle. If the moved position of the lens assembly 611 is the second position (e.g., 1602 in FIG. 16), the camera module 610 may be moved only within the second movement angle range.

At the operation 1507, when the moved position of the lens assembly 611 by the focus operation is a third position (e.g., 1603 in FIG. 16), the electronic device 101 may correct the motion of the camera module 610 within a third movement angle range corresponding to the third position under the control of the image signal processor 260 and/or the processor 120. For example, the third movement angle may be preset and stored within a range in which the lens assembly 611 does not collide with a mechanism disposed inside the electronic device 101. In order to compensate for any shake of the electronic device 101, the electronic device 101 may move the camera module 610 at a certain angle. If the moved position of the lens assembly 611 is the third position (e.g., 1603 in FIG. 16), the camera module 610 may be moved only within the third movement angle range.

According to certain embodiments, at the operation 1507, under the control of the image signal processor 260 and/or the processor 120, the electronic device 101 may determine a case where the moved position of the lens assembly 611 by the focus operation is an infinite focus position as the first position (e.g., 1601 in FIG. 16).

According to certain embodiments, at the operation 1507, under the control of the image signal processor 260 and/or the processor 120, the electronic device 101 may determine a case where the moved position of the lens assembly 611 by the focus operation is a middle focus position as the second position (e.g., 1602 in FIG. 16).

According to certain embodiments, at the operation 1507, under the control of the image signal processor 260 and/or the processor 120, the electronic device 101 may determine a case where the moved position of the lens assembly 611 by the focus operation is a macro focus position as the third position (e.g., 1603 in FIG. 16).

According to certain embodiments, at the operation 1507, the electronic device 101 may move the camera module 610 based on the movement angle determined depending on the focal length. For example, the electronic device 101 may identify the focal length to a targeted object and move the camera module 610 in response to the identified focal length. Specifically, if the focal length is a first focal length, the camera module 610 may be moved within a first range of the movement angle to compensate for shake. If the focal length is a second focal length, the camera module 610 may be moved within a second range of the movement angle to compensate for shake. For example, when the targeted object is a near object, the electronic device 101 may determine the focal length to the targeted object as the first focal length. In this case, the electronic device 101 may move the camera module 610 within the first range by using the image stabilizer actuator 620 in order to compensate for shake. The electronic device 101 may identify the focal length to the targeted object in real time and adjust the movement angle of the camera module 610 differently depending on the identified focal length. The focal length may be changed in response to a user input or may be automatically calculated by the camera 180.

FIG. 16 is a diagram illustrating first to third moved positions of the lens assembly 611 included in the camera 180 according to certain embodiments of the disclosure.

Referring to FIG. 16, when a point adjacent to the image sensor 230 is the lowest position (e.g., 0), the lens assembly 611 may move from the lowest position to a predetermined maximum height (e.g., H).

For example, when the range from the lowest position (e.g., 0) to the maximum height (e.g., H) is divided into three sections, a first section (0 to ⅓H) ranging from the lowest position (e.g., 0) to one third of the maximum height (e.g., 1/3H) may be referred to as the first position 1601. When the moved position of the lens assembly 611 by the focus operation is in the infinite focus position, the lens assembly 611 may be located at the first position 1601.

In addition, a second section (⅓H to ⅔H) ranging from one third of the maximum height (e.g., ⅓H) to two thirds of the maximum height (e.g., ⅔H) may be referred to as the second position 1602. When the moved position of the lens assembly 611 by the focus operation is in the middle focus position, the lens assembly 611 may be located at the second position 1602.

In addition, a third section (⅔H to H) ranging from two thirds of the maximum height (e.g., ⅔H) to the maximum height (e.g., H) may be referred to as the third position 1603. When the moved position of the lens assembly 611 by the focus operation is in the macro focus position, the lens assembly 611 may be located at the third position 1603.

Figure 17A:
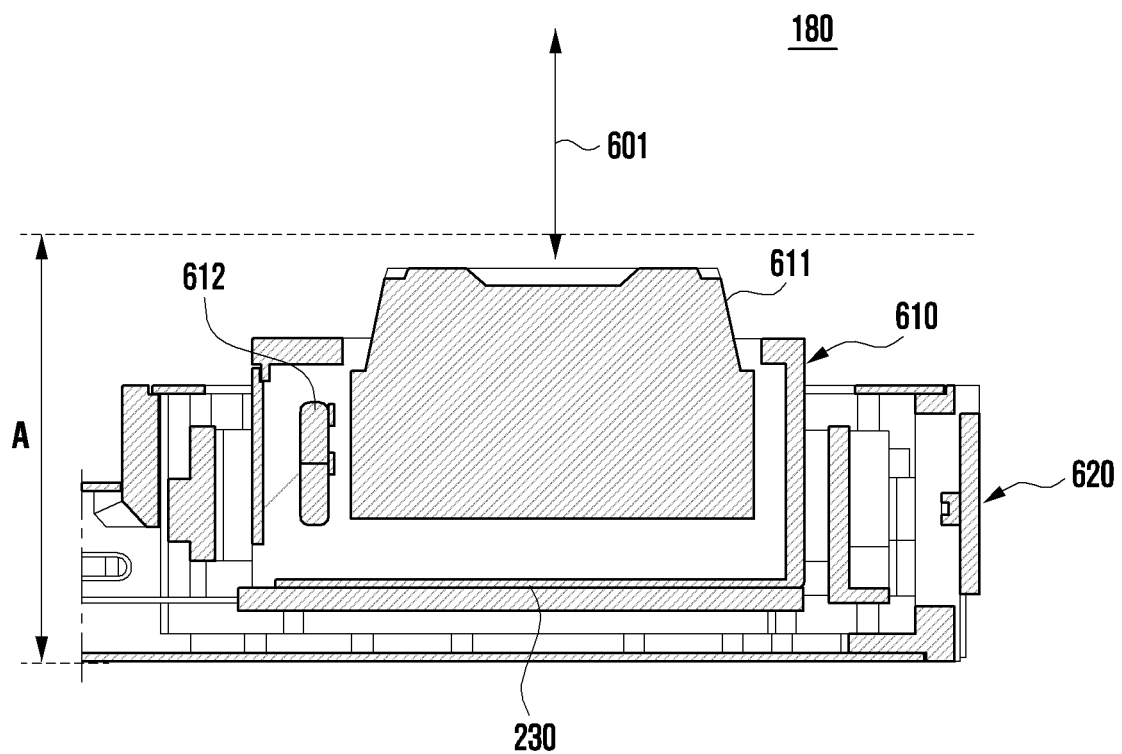
FIGS. 17A and 17B are diagrams illustrating a motion of a camera module included in an electronic device according to certain embodiments of the disclosure.
Figure 17B:
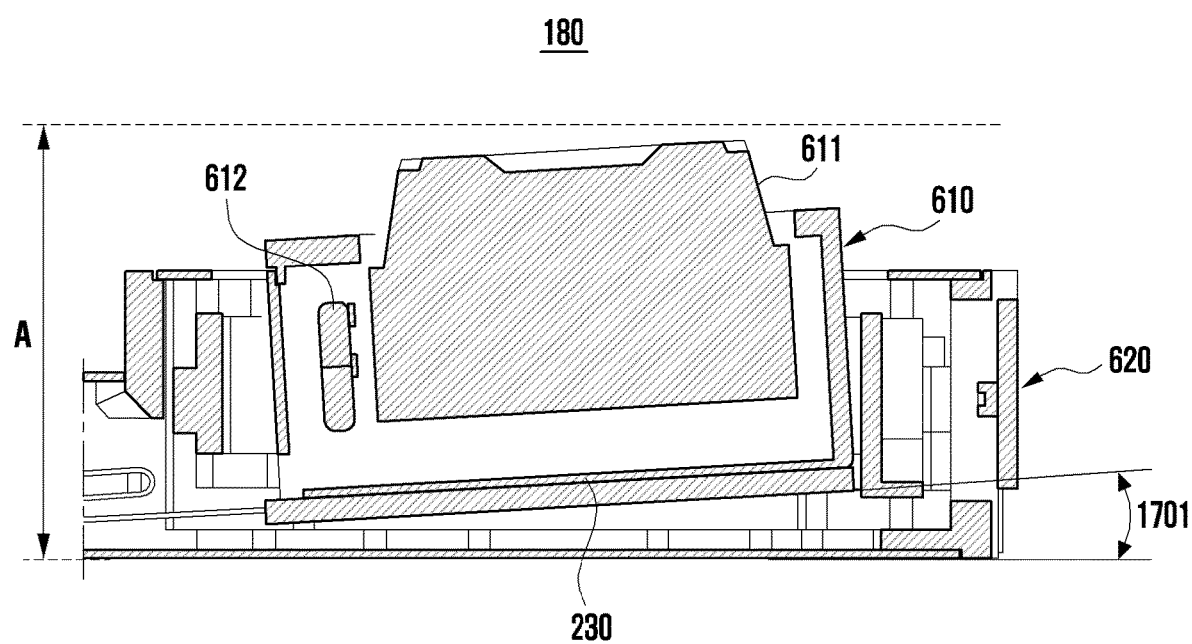

FIGS. 17A and 17B are diagrams illustrating a motion of the camera module 610 included in the electronic device 101 according to certain embodiments of the disclosure.

FIG. 17A illustrates a case where there is no motion of the camera module 610 by the image stabilizer actuator 620. The lens assembly 611 is coupled to the lens carrier 612 and may move in the direction of the optical axis 601 by the movement of the lens carrier 612. The lens carrier 612 may include, for example, a magnet and a coil. Under the control of the image signal processor 260 and/or the processor 120, the lens carrier 612 may control the electromagnetic force by controlling the current passing through the coil and also move the lens assembly 611 in the direction of the optical axis 601 by using Lorentz force resulting from the electromagnetic force.

FIG. 17B illustrates a motion of the camera module 610 when the lens assembly 611 is moved to the first, second, or third positions (e.g., 1601, 1602, or 1603 in FIG. 16) in the focus operation. Depending on the moved position of the lens assembly 611 by the focus operation, the camera module 610 may be moved within a predetermined movement angle range 1701.

According to certain embodiments, the electronic device 101 may identify (or determine) the predetermined movement angle range 1701, based on a designated distance (A) from a surface of a module housing (e.g., 640 in FIG. 10A) on which the camera module 610 is mounted. That is, when the camera module 610 is placed in the module housing 640, the designated distance (A) may be determined based on a first surface of the module housing on which the image sensor 230 is disposed. The designated distance (A) may include a distance from the first surface of the module housing to the transparent cover or cover glass (e.g., 1190 in FIG. 11C or 11D). The electronic device 101 may determine the movement angle range 1701, based on the designated distance (A), and the camera module 610 may compensate for shake without contact with the transparent cover or cover glass 1190. According to certain embodiments, the designated distance (A) may be preset in the electronic device 101 and may be variably changed depending on the replacement of the camera module 610.

According to certain embodiments, information on the position of the lens assembly 611 may be determined based on at least one of a focus position determined by a focus adjustment operation, a physical position of at least one lens in the lens assembly 611, or a numerical value determined by a designated focal length. Based on the determined position information of the lens assembly 611, the electronic device 101 may predict a location of a portion where the lens assembly 611 collides with some members of the camera 180.

According to certain embodiments, an electronic device (e.g., the electronic device 101) may include a processor (e.g., the processor 120) and a camera module (e.g., the camera module 610) functionally connected to the processor. The camera module may include a lens assembly (e.g., the lens assembly 611) including at least one lens, and an image sensor (e.g., the image sensor 230) for processing light acquired through the lens assembly. The processor may be configured to identify position information of the lens assembly, to move the camera module within a first range to correct a shake in an image acquired through the image sensor when the position information of the lens assembly corresponds to a first position, and to move the camera module within a second range to correct the shake in the image acquired through the image sensor when the position information of the lens assembly corresponds to a second position.

According to certain embodiments, the camera module (e.g., the camera module 610) may further include a focus control module configured to determine the position information of the lens assembly (e.g., the lens assembly 611).

According to certain embodiments, the position information of the lens assembly (e.g., the lens assembly 611) may be determined based on at least one of a focal length calculated to focus on a targeted object, a focus position, or a physical position of the lens assembly.

According to certain embodiments, the electronic device (e.g., the electronic device 101) may further include a gyro sensor (e.g., the sensor module 176) or an acceleration sensor (e.g., the sensor module 176) disposed inside or outside the camera module (e.g., the camera module 610). In this case, the processor (e.g., the processor 120) may be configured to move the camera module within the first range or the second range when a movement of the electronic device is detected through the gyro sensor or the acceleration sensor.

According to certain embodiments, the electronic device (e.g., the electronic device 101) may further include a module housing (e.g., the module housing 640) in which the camera module and an image stabilizer actuator (e.g., the image stabilizer actuator 620) related to a motion of the camera module (e.g., the camera module 610) are disposed, and a rotation guide (e.g., the rotation guide 630) combined with the module housing and providing a guide for a rotation angle of the camera module.

According to certain embodiments, the electronic device (e.g., the electronic device 101) may further include at least one camera module stopper (e.g., the camera module stopper 1101 or 1102) capable of restricting the motion of the camera module (e.g., the camera module 610).

According to certain embodiments, the processor (e.g., the processor 120) may be further configured to move the camera module (e.g., the camera module 610) within a third range to correct the shake in the image acquired through the image sensor (e.g., the image sensor 230) when the position information of the lens assembly (e.g., the lens assembly 611) corresponds to a third position.

According to certain embodiments, the processor (e.g., the processor 120) may be further configured to move the camera module (e.g., the camera module 610) within the first range when the position information of the lens assembly (e.g., the lens assembly 611) corresponds to an infinite focus position.

According to certain embodiments, the processor (e.g., the processor 120) may be further configured to move the camera module (e.g., the camera module 610) within the second range when the position information of the lens assembly (e.g., the lens assembly 611) corresponds to a middle focus position.

According to certain embodiments, the processor (e.g., the processor 120) may be further configured to move the camera module (e.g., the camera module 610) within the third range when the position information of the lens assembly (e.g., the lens assembly 611) corresponds to a macro focus position.

According to certain embodiments, an electronic device (e.g., the electronic device 101) may include a camera (e.g., the camera 180), at least one memory (e.g., the memory 130), and at least one processor (e.g., the processor 120) functionally connected to the camera and the at least one memory. The camera may include a camera module (e.g., the camera module 610) combined with an image sensor (e.g., the image sensor 230) and performing a focus operation by moving a lens assembly (e.g., the lens assembly 611), and an image stabilizer actuator (e.g., the image stabilizer actuator 620) for moving the camera module. The processor may be configured to activate the camera, to move a position of the lens assembly in the focus operation, to determine a movement angle range of the camera module corresponding to the moved position of the lens assembly, and to move the camera module within the determined movement angle range.

According to certain embodiments, the electronic device (e.g., the electronic device 101) may further include a gyro sensor (e.g., the sensor module 176) or an acceleration sensor (e.g., the sensor module 176) disposed inside or outside the camera. In this case, the processor (e.g., the processor 120) may be configured to move the camera module (e.g., the camera module 610) within the determined movement angle range when a movement of the electronic device is detected through the gyro sensor or the acceleration sensor.

According to certain embodiments, the electronic device (e.g., the electronic device 101) may further include a module housing (e.g., the module housing 640) in which the camera module (e.g., the camera module 610) and the image stabilizer actuator (e.g., the image stabilizer actuator 620) are disposed, and a rotation guide (e.g., the rotation guide 630) combined with the module housing and providing a guide for a rotation angle of the camera module.

According to certain embodiments, the electronic device (e.g., the electronic device 101) may further include at least one camera module stopper (e.g., the camera module stopper 1101 or 1102) capable of restricting a motion of the camera module (e.g., the camera module 610).

According to certain embodiments, the processor (e.g., the processor 120) may be further configured to identify the moved position of the lens assembly (e.g., the lens assembly 611), to move the camera module (e.g., the camera module 610) within a first movement angle range when the moved position is a first position, to move the camera module within a second movement angle range when the moved position is a second position, and to move the camera module within a third movement angle range when the moved position is a third position.

According to certain embodiments, the processor (e.g., the processor 120) may be further configured to move the camera module (e.g., the camera module 610) within the first movement angle range when the moved position of the lens assembly (e.g., the lens assembly 611) corresponds to an infinite focus position.

According to certain embodiments, the processor (e.g., the processor 120) may be further configured to move the camera module (e.g., the camera module 610) within the second movement angle range when the moved position of the lens assembly (e.g., the lens assembly 611) corresponds to a middle focus position.

According to certain embodiments, the processor (e.g., the processor 120) may be further configured to move the camera module (e.g., the camera module 610) within the third movement angle range when the moved position of the lens assembly (e.g., the lens assembly 611) corresponds to a macro focus position.

According to certain embodiments, the camera module may further include a focus control module configured to determine the moved position of the lens assembly (e.g., the lens assembly 611).

According to certain embodiments, a control method of an electronic device (e.g., the electronic device 101) may include identifying position information of a lens assembly (e.g., the lens assembly 611) included in a camera module (e.g., the camera module 610) functionally connected to the electronic device, determining a movement range of the camera module as a first range when the position information of the lens assembly corresponds to a first position, determining the movement range of the camera module as a second range when the position information of the lens assembly corresponds to a second position, and controlling a motion of the camera module, based on the first range or the second range.

An electronic device according to an embodiment may be one of various types of electronic devices. The electronic device may include a portable communication device (e.g., a smart phone), a computer device, a portable multimedia device, a portable medical device, a camera, a wearable device, or a home appliance. However, the electronic device is not limited to any of those described above.

Certain embodiments of the disclosure and the terms used herein are not intended to limit the technological features set forth herein to particular embodiments and include various changes, equivalents, or replacements for a corresponding embodiment. With regard to the description of the drawings, similar reference numerals may be used to refer to similar or related elements. A singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases.

The term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

While the disclosure has been particularly shown and described with reference to exemplary embodiments thereof, it will be understood by those skilled in the art that various changes in form and details may be made therein without departing from the scope of the subject matter as defined by the appended claims.

What is claimed is:

1. An electronic device comprising:
a processor; and
a lens assembly including at least one lens; and
an image sensor for processing light acquired through the lens assembly and connected to the processor, and
wherein the processor is configured to:
determine a distance of the lens assembly from the image sensor,
move the lens assembly and the image sensor within a first range to correct for shaking in an image acquired through the image sensor when the distance of the lens assembly from the image sensor is a first distance, and
move the lens assembly and the image sensor within a second range to correct for shaking in the image when the distance of the lens assembly from the image sensor is a second distance.

2. The electronic device of claim 1, further comprising a camera module, and wherein the camera module includes the lens assembly, the image sensor, and a focus control module configured to determine the distance of the lens assembly from the image sensor.

3. The electronic device of claim 1, further comprising:
a gyro sensor or an acceleration sensor connected to the processor,
wherein the processor is configured to move the lens assembly and the image sensor within the first range or the second range when a movement of the electronic device is detected through the gyro sensor or the acceleration sensor.

4. The electronic device of claim 1, further comprising:
a housing, wherein the lens assembly and image sensor are disposed in the housing;
an image stabilizer actuator configured to move the lens assembly and image sensor, wherein the image stabilizer is disposed in the housing; and
a rotation guide combined with the housing and providing a guide for a rotation angle of the lens assembly and the image sensor.

5. The electronic device of claim 4, further comprising:
at least one camera module stopper configured to restrict motion of the lens assembly and image sensor.

6. An electronic device comprising:
a processor; and
a camera module functionally connected to the processor,
wherein the camera module includes:
a lens assembly including at least one lens; and
an image sensor for processing light acquired through the lens assembly, and
wherein the processor is configured to:
determine position information of the lens assembly,
move the camera module within a first range to correct for shaking in an image acquired through the image sensor when the position information of the lens assembly corresponds to a first position, and
move the camera module within a second range to correct for shaking in the image when the position information of the lens assembly corresponds to a second position,
wherein the processor is further configured to move the camera module within a third range to correct for shaking in the image when the position information of the lens assembly corresponds to a third position.

7. The electronic device of claim 6, wherein the processor is further configured to move the camera module within the first range when the position information of the lens assembly corresponds to an infinite focus position.

8. The electronic device of claim 6, wherein the processor is further configured to move the camera module within the second range when the position information of the lens assembly corresponds to a middle focus position.

9. The electronic device of claim 6, wherein the processor is further configured to move the camera module within the third range when the position information of the lens assembly corresponds to a macro focus position.

10. An electronic device comprising:
a camera;
at least one memory; and
a processor functionally connected to the camera and the at least one memory, wherein the camera includes:
an image sensor and a lens assembly, wherein the image sensor is configured to capture an image, and wherein the lens assembly is configured to move, and wherein movement by the lens assembly causes a focusing operation on the image; and
an image stabilizer actuator for moving the lens assembly, and
wherein the processor is configured to:
activate the camera,
move the lens assembly in the focus operation,
determine a movement angle range of the lens assembly and the image sensor corresponding to a distance of the moved lens assembly from the image sensor, and
move the lens assembly and the image sensor within the determined movement angle range.

11. The electronic device of claim 10, further comprising:
a gyro sensor or an acceleration sensor disposed inside or outside the camera,
wherein the processor is configured to move the lens assembly and the image sensor within the determined movement angle range when a movement of the electronic device is detected through the gyro sensor or the acceleration sensor.

12. The electronic device of claim 10, further comprising:
a housing, wherein the lens assembly and the image sensor and the image stabilizer actuator are disposed in the housing; and
a rotation guide receiving the housing and providing a guide for a rotation angle of the lens assembly and the image sensor.

13. The electronic device of claim 12, further comprising:
at least stopper capable of restricting a motion of the lens assembly and the image sensor.

14. The electronic device of claim 10, comprising a focus control module configured to determine the moved position of the lens assembly.

15. An electronic device comprising:
a camera;
at least one memory; and
a processor functionally connected to the camera and the at least one memory,
wherein the camera includes:
a camera module comprising an image sensor and a lens assembly, wherein the image sensor is configured to capture an image, and wherein the lens assembly is configured to move, and wherein movement by the lens assembly causes a focusing operation of on the image; and
an image stabilizer actuator for moving the lens assembly, and
wherein the processor is configured to:
activate the camera,
move a position of the lens assembly in the focus operation,
determine a movement angle range of the camera module corresponding to the moved position of the lens assembly,
move the camera module within a first movement angle range when the moved position is a first position,
move the camera module within a second movement angle range when the moved position is a second position, and
move the camera module within a third movement angle range when the moved position is a third position.

16. The electronic device of claim 15, wherein the processor is further configured to move the camera module within the first movement angle range when the moved position of the lens assembly corresponds to an infinite focus position.

17. The electronic device of claim 15, wherein the processor is further configured to move the camera module within the second movement angle range when the moved position of the lens assembly corresponds to a middle focus position.

18. The electronic device of claim 15, wherein the processor is further configured to move the camera module within the third movement angle range when the moved position of the lens assembly corresponds to a macro focus position.

19. A control method of an electronic device, the method comprising:
identifying a distance of a lens assembly included in a camera module functionally connected to the electronic device from an image sensor included in the camera module;
determining a movement range of the lens assembly and the image sensor as a first range when the distance of the lens assembly to the image sensor is a first distance;
determining the movement range of the lens assembly and the image sensor as a second range when the distance of the lens assembly to the image sensor is a second distance; and
controlling a motion of the lens assembly and the image sensor, based on the first range or the second range.

* * * * *

UNITED STATES PATENT AND TRADEMARK OFFICE
CERTIFICATE OF CORRECTION

PATENT NO. : 11,412,143 B2
APPLICATION NO. : 17/106278
DATED : August 9, 2022
INVENTOR(S) : Kwangseok Byon et al.

It is certified that error appears in the above-identified patent and that said Letters Patent is hereby corrected as shown below:

In the Claims

Column 30, Claim 5, Line 29 should read as follows:
--...at least stopper configured to restrict...--

Column 31, Claim 14, Line 36 should read as follows:
--The electronic device of claim 10, further comprising a focus...--

Column 31, Claim 15, Line 50 should read as follows:
--...operation on the image; and...--

Signed and Sealed this
Sixth Day of September, 2022

Katherine Kelly Vidal
*Director of the United States Patent and Trademark Office*